(12) United States Patent
Hager

(10) Patent No.: US 9,715,876 B2
(45) Date of Patent: Jul. 25, 2017

(54) CORRECTING TRANSCRIBED AUDIO FILES WITH AN EMAIL-CLIENT INTERFACE

(71) Applicant: III Holdings 1, LLC, Wilmington, DE (US)

(72) Inventor: Paul M. Hager, Stoughton, WI (US)

(73) Assignee: III HOLDINGS 1, LLC, Wilmington, DE (US)

( * ) Notice: Subject to any disclaimer, the term of this patent is extended or adjusted under 35 U.S.C. 154(b) by 293 days.

(21) Appl. No.: 14/158,311

(22) Filed: Jan. 17, 2014

(65) Prior Publication Data

US 2014/0136199 A1  May 15, 2014

Related U.S. Application Data

(63) Continuation of application No. 12/746,352, filed as application No. PCT/US2008/085498 on Dec. 4, 2008, now abandoned.

(Continued)

(51) Int. Cl.
| | |
|---|---|
| *G10L 15/00* | (2013.01) |
| *G10L 15/26* | (2006.01) |
| *G06Q 10/10* | (2012.01) |
| *H04L 29/08* | (2006.01) |
| *G06F 17/21* | (2006.01) |

(Continued)

(52) U.S. Cl.
CPC ............ *G10L 15/26* (2013.01); *G06F 17/21* (2013.01); *G06Q 10/107* (2013.01); *H04L 51/066* (2013.01); *H04L 67/36* (2013.01); *G10L 15/30* (2013.01); *H04L 51/10* (2013.01)

(58) Field of Classification Search
CPC ......... G10L 15/00; G10L 15/08; G10L 15/26; G10L 15/265; G10L 15/28; G10L 15/30; G10L 15/32; G10L 15/34; G10L 2015/00; G10L 2015/08; G10L 2015/22;
(Continued)

(56) References Cited

U.S. PATENT DOCUMENTS 5,875,436 A * 2/1999 Kikinis ........................ 705/34
5,956,681 A    9/1999 Yamakita
(Continued)

FOREIGN PATENT DOCUMENTS

| GB | 2427500 | 12/2006 |
| GB | 2451371 | 1/2009 |

(Continued)

OTHER PUBLICATIONS

International Preliminary Report on Patentability for PCT/US2007/066791 dated Oct. 7, 2009; 6 pages.
(Continued)

*Primary Examiner* — Paras D Shah
(74) *Attorney, Agent, or Firm* — Schwabe, Williamson & Wyatt

(57) ABSTRACT

Methods and systems for requesting a transcription of audio data. One method includes displaying a send-for-transcription button within an email-client interface on a computer-controlled display, and automatically sending a selected email message and associated audio data to a transcription server as a request for a transcription of the associated audio data when a user selects the send-for-transcription button.

19 Claims, 15 Drawing Sheets

Related U.S. Application Data

(60) Provisional application No. 61/076,054, filed on Jun. 26, 2008, provisional application No. 61/005,456, filed on Dec. 4, 2007, provisional application No. 60/992,187, filed on Dec. 4, 2007.

(51) Int. Cl.
*G10L 15/30* (2013.01)
*H04L 12/58* (2006.01)

(58) Field of Classification Search
CPC ........ G10L 2015/225; G10L 2015/228; H04M 3/4936; H04M 2201/40
USPC ....... 704/231, 235, 246, 251, 254, 257, 275, 704/270; 379/88.01, 88.04, 88.08, 88.11, 379/88.16, 88.22, 88.23
See application file for complete search history.

(56) References Cited

U.S. PATENT DOCUMENTS

| | | | |
|---|---|---|---|
| 6,173,259 B1 | 1/2001 | Bijl et al. | |
| 6,222,909 B1 | 4/2001 | Qua et al. | |
| 6,243,677 B1 | 6/2001 | Arslan et al. | |
| 6,275,849 B1 | 8/2001 | Ludwig | |
| 6,308,151 B1 | 10/2001 | Smith | |
| 6,366,882 B1* | 4/2002 | Bijl et al. | 704/235 |
| 6,404,762 B1 | 6/2002 | Luzeski et al. | |
| 6,411,685 B1 | 6/2002 | O'Neal | |
| 6,418,410 B1 | 7/2002 | Nassiff | |
| 6,483,899 B2 | 11/2002 | Agraharam et al. | |
| 6,507,643 B1 | 1/2003 | Groner | |
| 6,535,586 B1 | 3/2003 | Cloutier et al. | |
| 6,643,291 B1 | 11/2003 | Yoshihara et al. | |
| 6,697,458 B1 | 2/2004 | Kunjibettu | |
| 6,697,841 B1 | 2/2004 | Sheffield et al. | |
| 6,704,394 B1 | 3/2004 | Kambhatla et al. | |
| 6,738,800 B1 | 5/2004 | Aquilon et al. | |
| 6,775,359 B1 | 8/2004 | Ron et al. | |
| 6,775,651 B1* | 8/2004 | Lewis et al. | 704/235 |
| 6,823,306 B2 | 11/2004 | Reding et al. | |
| 6,857,008 B1 | 2/2005 | Shenefiel | |
| 6,865,258 B1* | 3/2005 | Polcyn | 379/88.01 |
| 6,868,143 B1 | 3/2005 | Menon et al. | |
| 6,901,364 B2 | 5/2005 | Nguyen et al. | |
| 6,937,986 B2 | 8/2005 | Denenberg et al. | |
| 6,965,666 B1 | 11/2005 | Zhang | |
| 6,980,953 B1* | 12/2005 | Kanevsky | G06F 17/289 704/2 |
| 7,016,844 B2* | 3/2006 | Othmer et al. | 704/270.1 |
| 7,023,968 B1 | 4/2006 | Silvester | |
| 7,035,804 B2* | 4/2006 | Saindon et al. | 704/271 |
| 7,103,154 B1 | 9/2006 | Cannon et al. | |
| 7,130,401 B2 | 10/2006 | Rampey et al. | |
| 7,130,918 B2 | 10/2006 | Ouzounidis et al. | |
| 7,146,320 B2 | 12/2006 | Ju et al. | |
| 7,317,788 B2 | 1/2008 | Caspi et al. | |
| 7,346,505 B1* | 3/2008 | Sherwood | 704/235 |
| 7,539,086 B2* | 5/2009 | Jaroker | 369/25.01 |
| 7,706,520 B1 | 4/2010 | Waterson et al. | |
| 8,407,052 B2 | 3/2013 | Hager | |
| 2002/0085690 A1* | 7/2002 | Davidson | H04M 1/6505 379/88.17 |
| 2002/0159573 A1 | 10/2002 | Hitzeman et al. | |
| 2002/0178002 A1 | 11/2002 | Boguraev et al. | |
| 2003/0002643 A1 | 1/2003 | Seibel et al. | |
| 2003/0009528 A1 | 1/2003 | Sharif et al. | |
| 2003/0036903 A1 | 2/2003 | Konopka et al. | |
| 2003/0046350 A1 | 3/2003 | Chintalapati et al. | |
| 2003/0050777 A1 | 3/2003 | Walker, Jr. | |
| 2003/0068023 A1 | 4/2003 | Singh | |
| 2003/0105631 A1 | 6/2003 | Habte | |
| 2003/0122922 A1 | 7/2003 | Saffer et al. | |
| 2003/0220784 A1* | 11/2003 | Fellenstein et al. | 704/201 |
| 2003/0223556 A1 | 12/2003 | Ju et al. | |
| 2004/0062365 A1 | 4/2004 | Agraharam et al. | |
| 2004/0172245 A1 | 9/2004 | Rosen et al. | |
| 2004/0252679 A1 | 12/2004 | Williams et al. | |
| 2005/0010411 A1 | 1/2005 | Rigazio et al. | |
| 2005/0013419 A1 | 1/2005 | Pelaez et al. | |
| 2005/0015443 A1 | 1/2005 | Levine et al. | |
| 2005/0028212 A1 | 2/2005 | Laronne et al. | |
| 2005/0058260 A1 | 3/2005 | Lasensky et al. | |
| 2005/0076109 A1 | 4/2005 | Mathew et al. | |
| 2005/0100142 A1 | 5/2005 | Gandhi et al. | |
| 2005/0102139 A1 | 5/2005 | Fukada | |
| 2005/0163289 A1 | 7/2005 | Caspi et al. | |
| 2005/0187766 A1 | 8/2005 | Rennillo et al. | |
| 2005/0288926 A1 | 12/2005 | Benco et al. | |
| 2006/0029197 A1 | 2/2006 | Pham | |
| 2006/0047518 A1 | 3/2006 | Claudatos et al. | |
| 2006/0095259 A1 | 5/2006 | Bahl et al. | |
| 2006/0123347 A1 | 6/2006 | Hewitt et al. | |
| 2006/0135128 A1 | 6/2006 | Skoog | |
| 2006/0140360 A1* | 6/2006 | Crago et al. | 379/88.18 |
| 2006/0143307 A1* | 6/2006 | Codignotto | 709/246 |
| 2006/0168259 A1 | 7/2006 | Spilotro et al. | |
| 2006/0193450 A1 | 8/2006 | Flynt et al. | |
| 2006/0223502 A1 | 10/2006 | Doulton | |
| 2006/0234680 A1 | 10/2006 | Doulton | |
| 2006/0245434 A1 | 11/2006 | Wang et al. | |
| 2006/0271365 A1* | 11/2006 | Maes | G10L 15/22 704/254 |
| 2006/0287854 A1 | 12/2006 | Smolenski et al. | |
| 2007/0005709 A1 | 1/2007 | Johnson et al. | |
| 2007/0041522 A1 | 2/2007 | Abella et al. | |
| 2007/0047702 A1 | 3/2007 | Newell et al. | |
| 2007/0050191 A1* | 3/2007 | Weider | G06F 17/30864 704/275 |
| 2007/0083656 A1 | 4/2007 | Bobo, II | |
| 2007/0088808 A1 | 4/2007 | Bobo, II | |
| 2007/0127640 A1* | 6/2007 | Brunel | H04L 12/58 379/88.13 |
| 2007/0129949 A1* | 6/2007 | Alberth et al. | 704/270.1 |
| 2007/0156400 A1 | 7/2007 | Wheeler | |
| 2007/0203901 A1* | 8/2007 | Prado et al. | 707/5 |
| 2007/0208570 A1* | 9/2007 | Bhardwaj et al. | 704/270.1 |
| 2007/0299664 A1 | 12/2007 | Peters et al. | |
| 2008/0102863 A1* | 5/2008 | Hardy et al. | 455/466 |
| 2008/0198981 A1* | 8/2008 | Skakkebaek et al. | 379/88.13 |
| 2008/0221884 A1* | 9/2008 | Cerra et al. | 704/243 |
| 2008/0300873 A1* | 12/2008 | Siminoff | 704/235 |
| 2009/0070109 A1* | 3/2009 | Didcock et al. | 704/235 |
| 2009/0276215 A1 | 11/2009 | Hager | |
| 2011/0022387 A1 | 1/2011 | Hager | |
| 2013/0197909 A1 | 8/2013 | Hager | |
| 2014/0114658 A1 | 4/2014 | Hager | |
| 2016/0117310 A1 | 4/2016 | Hager | |

FOREIGN PATENT DOCUMENTS

| | | |
|---|---|---|
| WO | 2004095422 | 11/2004 |
| WO | 2007121441 | 10/2007 |
| WO | 2009073768 | 6/2009 |

OTHER PUBLICATIONS

Stolowitz Ford Cowger LLP; Listing of Related Cases dated Aug. 12, 2014; 2 pages.
Office Action from the United Kingdom Intellectual Property Office for Application No. 0819421.9 dated May 5, 2010 (2 pages).
PCT/US2007/066791 International Search Report dated May 2, 2008 (2 pages).
International Search Report and Written Opinion for Application No. PCT/US2008/085498 dated Apr. 16, 2009 (11 pages).
International Preliminary Search Report for Application No. PCT/US2008/085498 dated Jun. 17, 2010 (8 pages).
Office Action from the United States Patent and Trademark Office for U.S. Appl. No. 13/803,733 dated Jun. 26, 2013.

(56) References Cited

OTHER PUBLICATIONS

Schwabe Williamson & Wyatt; Listing of Related Cases dated Aug. 15, 2016; 1 page.

* cited by examiner

| FROM | SUBJECT |
|---|---|
| TRANSCRIPTION SERVER | NEW MESSAGE FOR ACCOUNT NUMBER: 30S FROM "LACKNER HENRY" |
| JENNIFER JONES | FIRE DRILL TONIGHT AT 5:00PM |
| TRANSCRIPTION SERVER | NEW MESSAGE FOR ACCOUNT NUMBER: 30A FROM "LACKNER HENRY" |

FIG. 9

From: Transcription Server <name@url.com>
To: June Daily <june.daily@acme.com>
Subject: New message for account number: 305 from "Lackner Henry"
Date: Sat, 3 Mar 2007 08:05:30 +0000

June Daily,

There is a new file available for account number: 305:

From:     "Lackner Henry"
Length:   0:49 seconds
Date:     Wednesday, February 28, 2007 at 03:10:59 PM To read the transcription of this message and listen to your message online, go to:
https://www.url.com/loginpage.aspx

FIG. 10

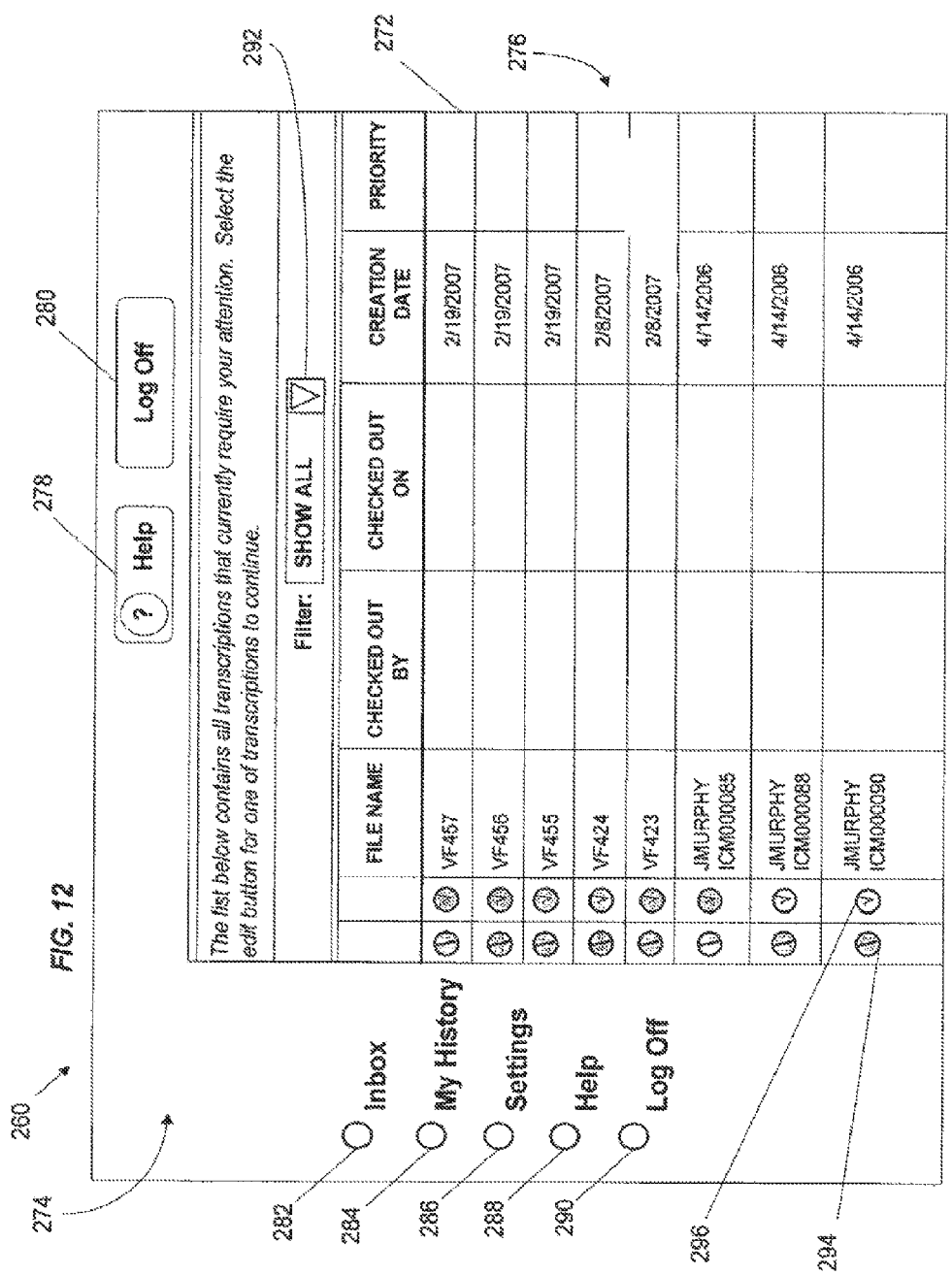

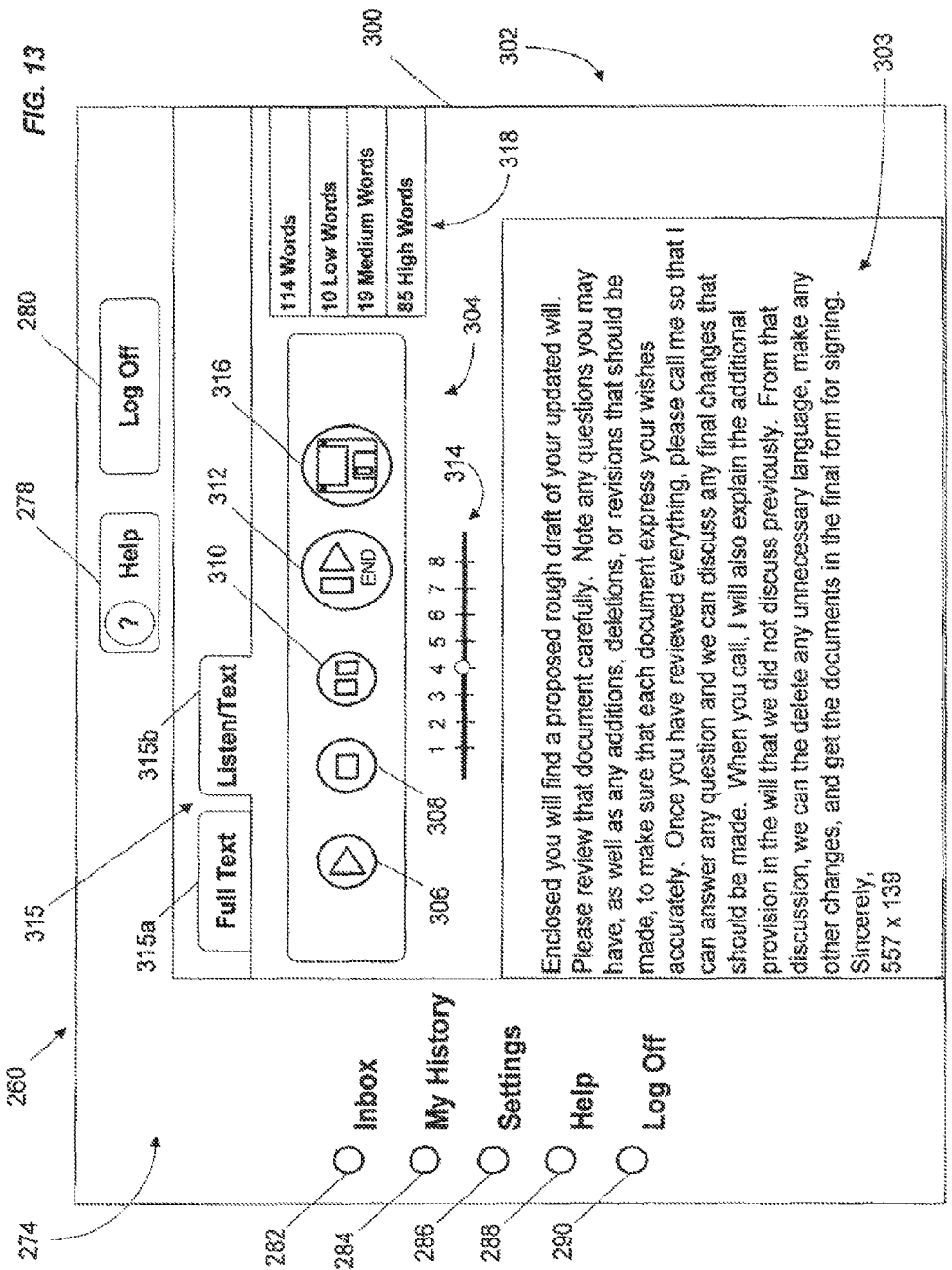

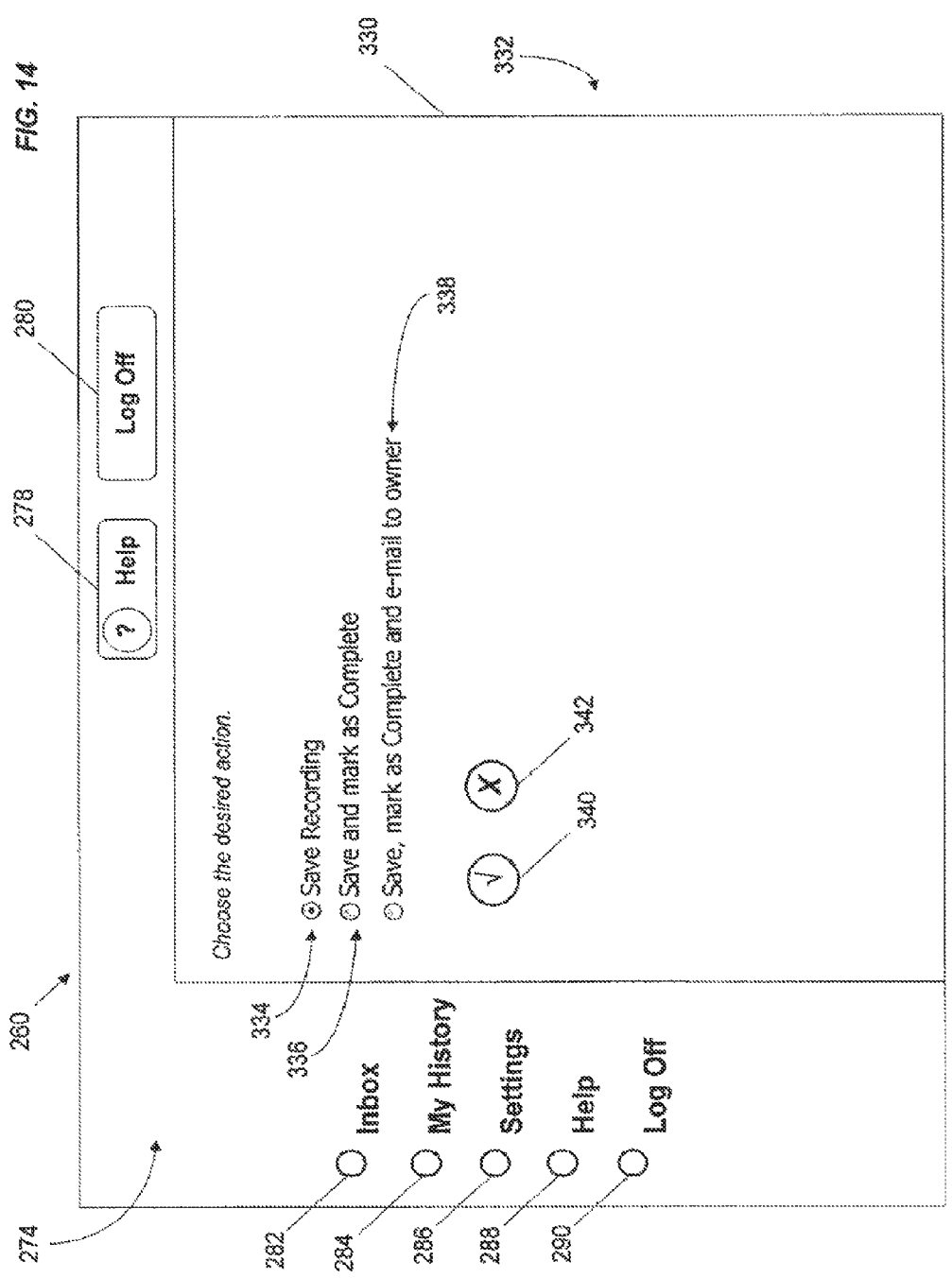

From: system@url.com [mailto: system@company.com]
Sent: Wednesday, February 28, 2007 5:34 PM
To: june.daily@acme.com
Subject: Your message from ("Henry Lackner" <6084671992>) has been transcribed Enclosed you will find a proposed rough draft of your updated Will. Please review this document carefully. Note any questions you may have, as well as any additions, deletions, or revisions that should be made, to make sure that each document expresses your wishes accurately. Once you have reviewed everything, please call me so that I can answer any questions and so that we can discuss any final changes that should be made. When you call, I will also explain the additional provision in the Will that we did not discuss previously. From that discussion, we can the delete any unnecessary language, make any other changes, and get the documents in final form for signing. Sincerely,

CORRECTING TRANSCRIBED AUDIO FILES WITH AN EMAIL-CLIENT INTERFACE

RELATED APPLICATIONS

The present application is a continuation of U.S. application Ser. No. 12/746,352, filed Oct. 7, 2010, which is an application filed under 35 U.S.C. §371 from International Application PCT/US2008/085498 filed on Dec. 4, 2008, which claims priority to U.S. Provisional Application 60/992,187 filed on Dec. 4, 2007; U.S. Provisional Application 61/005,456 filed on Dec. 4, 2007; and U.S. Provisional Application 61/076,054 filed on Jun. 26, 2008. The entire content of U.S. application Ser. No. 12/746,352, International Application PCT/US2008/085498, International Application No. PCT/US2007/066791, U.S. Provisional Application 60/792,640, U.S. Provisional Application 60/992,187, U.S. Provisional Application 61/005,456, and U.S. Provisional Application 61/076,054 is incorporated by reference herein.

BACKGROUND OF THE INVENTION

Each day individuals and companies receive multiple audio messages. These audio messages can include personal greetings and information or business-related instructions and information. In either case, it may be useful or required that the audio messages be transcribed in order to create written records of the messages.

Software currently exists that generates written text based on audio data. For example, Nuance Communications, Inc. provides a number of software programs, trademarked "Dragon," that take audio files in .WAV format, .MP3 format, or other audio formats and translate such files into text files. The Dragon software also provides mechanisms for comparing audio files to text files in order to "learn" and improve future transcriptions. The "learning" mechanism included in the Dragon software, however, is only intended to learn based on a voice-dependent model, which means that the same person trains the software program over time. In addition, learning mechanisms in existing transcription software are often non-continuous and include set training parameters that limit the amount of training that is performed.

SUMMARY OF THE INVENTION

Embodiments of the present invention provide methods and systems for correcting transcribed text. One method includes a user sending one or more emails to a transcription server that include audio data via an email-client interface. The emails may be sent from one or more data sources running email-clients and include audio data to be transcribed. The audio data is transcribed based on a voice model to generate text data. The method also includes making the text data available to the user over at least one computer network and receiving corrected text data over the at least one computer network from the user. In addition, the method includes modifying the voice model based on the corrected text data.

Embodiments of the present invention also provide systems for correcting transcribed text. One system includes a transcription server, at least one translation server, an email-client correction interface, and at least one training server. The transcription server receives audio data from one or more audio data sources and the translation server can transcribe the audio data based on a voice model to generate text data. The email-client correction interface is accessible by a user from within an email-client and provides the user with access to the text data. The transcription server also receives corrected text data from the plurality of users. The training server then modifies the voice model based on the corrected text data.

Additional embodiments of the invention also provide methods of performing audio data transcription. One method includes obtaining audio data from at least one audio data source, such as a voice over IP system or a voicemail system, transcribing the audio data based on a voice-independent model to generate text data, and sending the text data to an owner of the audio data as an email message.

Embodiments of the invention also provide a method of requesting a transcription of audio data. The method includes displaying a send-for-transcription button within an email-client interface on a computer-controlled display, and automatically sending a selected email message and associated audio data to a transcription server as a request for a transcription of the associated audio data when a user selects the send-for-transcription button.

Further embodiments of the invention provide a system for requesting a transcription of audio data. The system includes a transcription server and an email-client interface. The email-client interface displays at least one email message associated with audio data to a user, displays a send-for-transcription button to the user, receives a selection of the at least one email message from the user, receives a selection of the send-for-transcription button from the user, and automatically sends the at least one email message and associated audio data to the transcription server as a request for a transcription of the associated audio data in response to the user's selection of the send-for-transcription button.

Additional embodiments of the invention also provide a system for generating a transcription of audio data. The system includes a transcription server and a translation server. The transcription server is configured to receive at least one email message and associated audio data from an email-client, identify an account based on the at least one email message, and obtain stored account settings associated with the identified account. The translation server is configured to generate a transcription of the associated audio data based on the account settings and a voice-independent model.

BRIEF DESCRIPTION OF THE DRAWINGS

In the drawings:

FIGS. 9-10 illustrate a correction notification according to an embodiment of the invention.

FIGS. 11-14 illustrate an email-client correction interface according to an embodiment of the invention.

FIG. 15 illustrates a message notification according to an embodiment of the invention.

DETAILED DESCRIPTION

Figure 1:
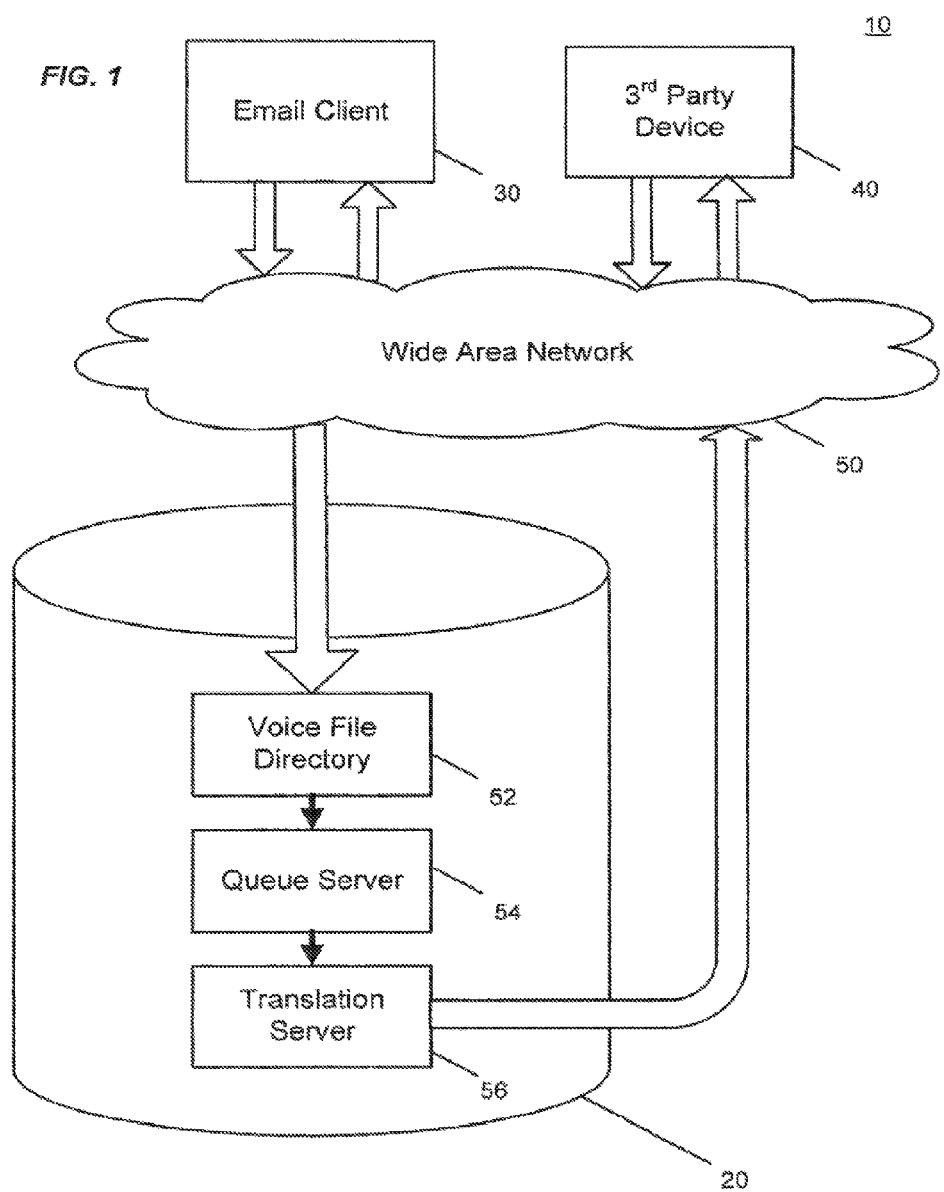
FIGS. 1 and 2 schematically illustrate systems for transcribing audio data according to various embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In addition, it should be understood that embodiments of the invention include hardware, software, and electronic components or modules that, for purposes of discussion, may be illustrated and described as if the majority of the components were implemented solely in hardware. However, based on a reading of this detailed description, one of ordinary skill in the art would recognize that, in at least one embodiment, the electronic based aspects of the invention may be implemented in software. As such, it should be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention. Other alternative configurations are possible.

FIG. 1 illustrates a transcription system 10 for transcribing audio data according to an embodiment of the invention. As shown in FIG. 1, the system 10 includes a transcription server 20, a data source running an email-client 30, and a third party device 40. The transcription server 20 includes, among other things, a voice file directory 52, a queue server 54, and a translation server 56. The transcription server is described in more detail below. The data source email-client 30 and the third party device 40 can be connected to the transcription server 20 via a wide area network 50 such as a cellular network or the Internet.

Information flow through the system 10 begins in the data source email-client 30. The data source email-client 30 can include a stand-alone email-client, such as Outlook manufactured by Microsoft™ or Lotus Notes manufactured by IBM™. In other embodiments, the data source email-client 30 can include a browser-based email-client, such as Hotmail, Gmail, Yahoo, AOL, etc. As described below, in addition to providing standard emailing operations, the data source email-client 30 can provide one or more email-client interfaces (e.g., via one or more plug-ins or additional software modules installed and used as part of the email-client 30) that allow a user to request, view, manage, and correct transcribed text data.

A user sends information from the data source email-client 30 through the wide area network 50 (e.g. a cellular network, the Internet, etc.) to the transcription server 20. The transcription server 20 places the information in the voice file directory 52 related to an account for the user that sent the information. The information to be transcribed is placed in the queue server 54 before being routed to the translation server 56 to be transcribed. After the information has been transcribed, it is sent back through the wide area network 50 and may, optionally, be sent to a third party device 40 for correction. In some embodiments, if the information is not sent to a third party device 40 for correction or if the third party device 40 has finished correcting the transcription, the information is sent back to the data source email-client 30.

Figure 2:
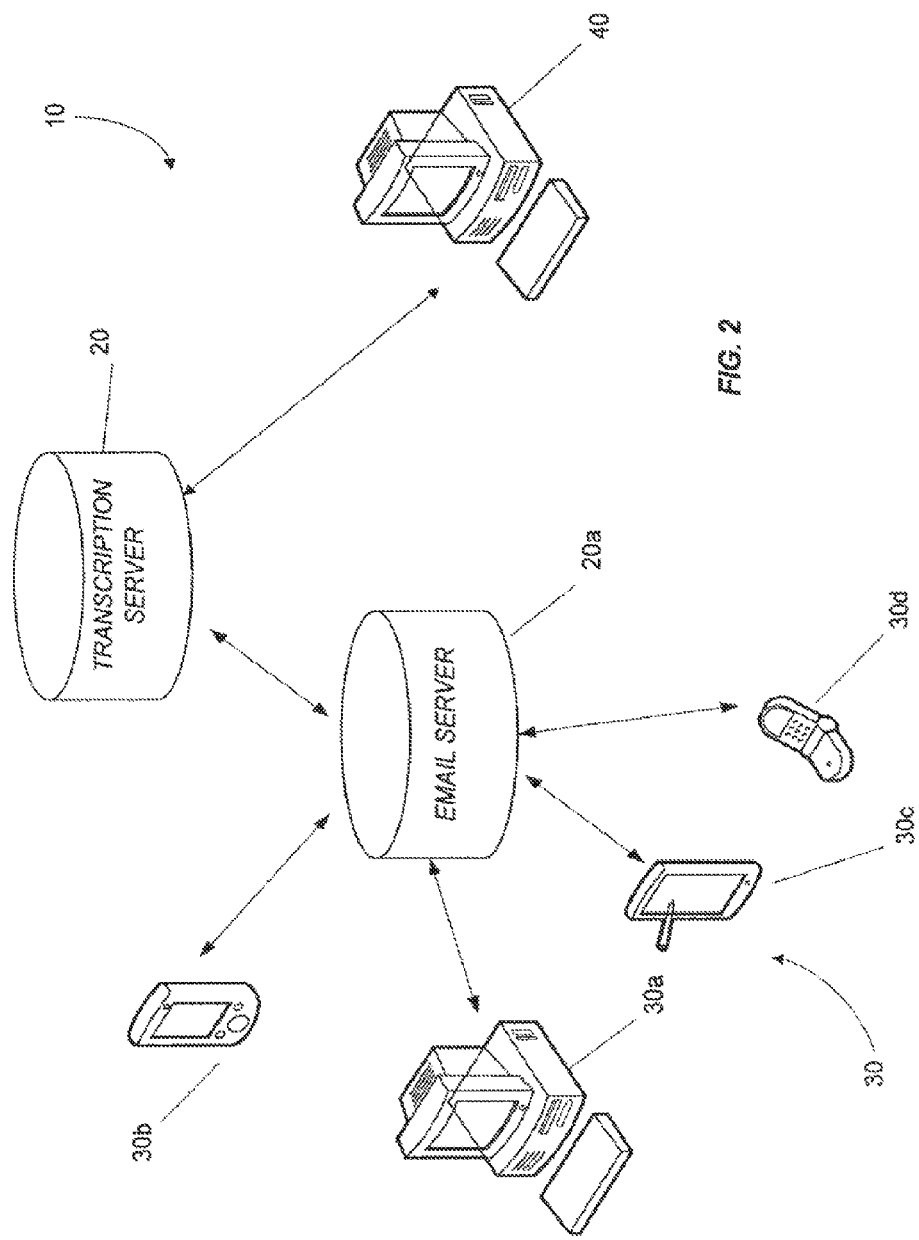

FIG. 2 illustrates an exemplary embodiment of the network 10 from FIG. 1. The transcription server 20 can include or can be connected to an email server 20a that receives email messages from a client computer 30a or other devices running email-clients, such as a personal digital assistant ("PDA") 30b, a Blackberry device 30c, or a mobile phone 30d. In other embodiments, additional devices that support email-clients may also by used. The system 10 also includes a third party device 40. The third party device 40 can receive messages including transcribed text to be corrected or checked before the text is sent back to the user. As described below, in some embodiments, the third party device 40 provides one or more email-client interfaces for viewing and correcting transcribed text.

Figure 3:
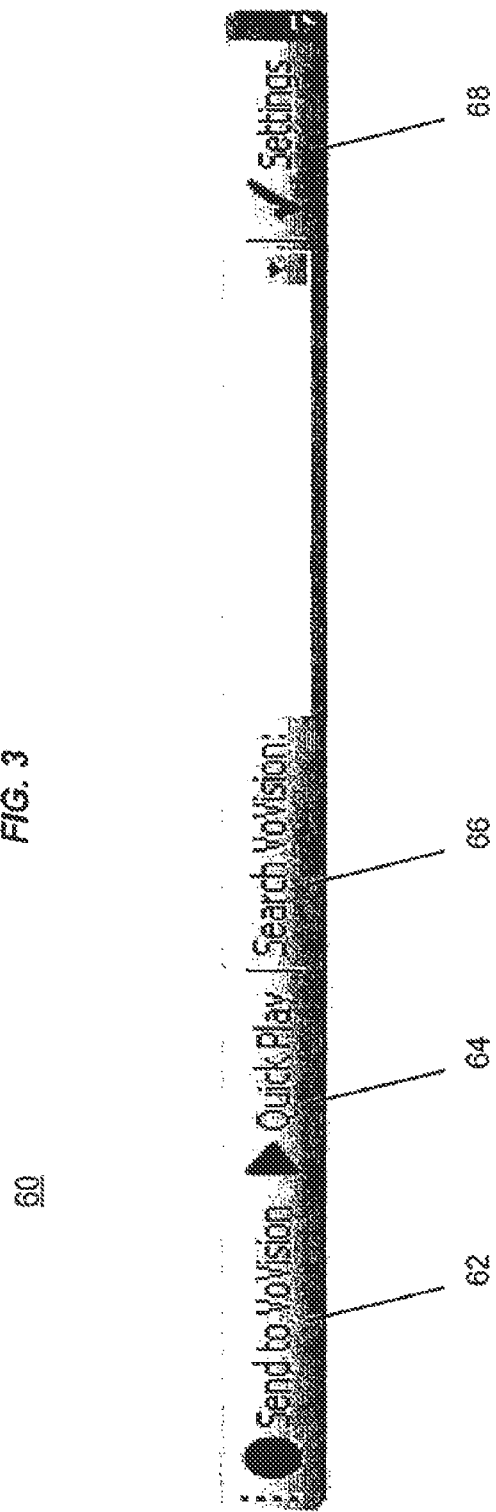
FIG. 3 illustrates an email-client interface according to an embodiment of the invention.

FIG. 3 illustrates an embodiment of an email-client interface 60. The email-client interface 60 allows a user to interact with the transcription server 20 from FIGS. 1 and 2. In some embodiments, the email-client interface 60 is provided through an email-client, such as the data source email-client 30. The email-client can include a stand-alone email-client, such as Outlook manufactured by Microsoft™ or Lotus Notes manufactured by IBM™. In other embodiments, the email-client can include a browser-based email-client, such as Hotmail, Gmail, Yahoo, AOL, etc. In some embodiments, the email-client interface 60 is provided by a plug-in or additional software module that is installed and used with the email-client, which allows a user to access and manage transcribed text from within a standard email-client and without having to launch and access a separate interface for managing transcribed text.

As shown in FIG. 3, the email-client interface 60 includes a send button 62, a quick play button 64, a search field 66, and an options button 68. The send button 60 allows the user to send one or more selected email messages that include audio data to the transcription server 20. The search field 66 allows a user to search messages that have already been sent to the transcription server 20. As a result, the search field 66 allows a user to access information within the transcription system 10 without having to access a web interface. The quick play button 64 allows the user to play audio data related to a message that has already been sent to the transcription server 20. The options button 68 allows a user to modify features related to the email-client interface 60 and an email-client correction interface described below. In some embodiments, the options button 68 allows a user to modify account settings related to delivery settings, transcription settings, format settings, and the like. In other embodiments, the email-client interface 60 includes additional buttons and functionality.

In conjunction with the email-client interface 60, the email-client correction interface is also accessed from within an email-client, such as the data source email-client 30 or an email-client executed by the third party device 40. In some embodiments, the email-client correction interface is also is provided by a plug-in or additional software module that is installed and used with the email-client. The email-client correction interface can be part of the same plug-in providing the email-client interface 60.

The email-client correction interface allows a user to access a web-based correction interface from within an email-client, eliminating the need to launch a separate web browsing application or interface. Aspects of the email-client correction interface include, among other things, the ability to view and correct transcriptions of audio data, monitor the transcription status of audio data sent to the transcription server, and modify account settings. The email-client correction interface is described in greater detail below with respect to FIGS. 11-14.

Figure 4:
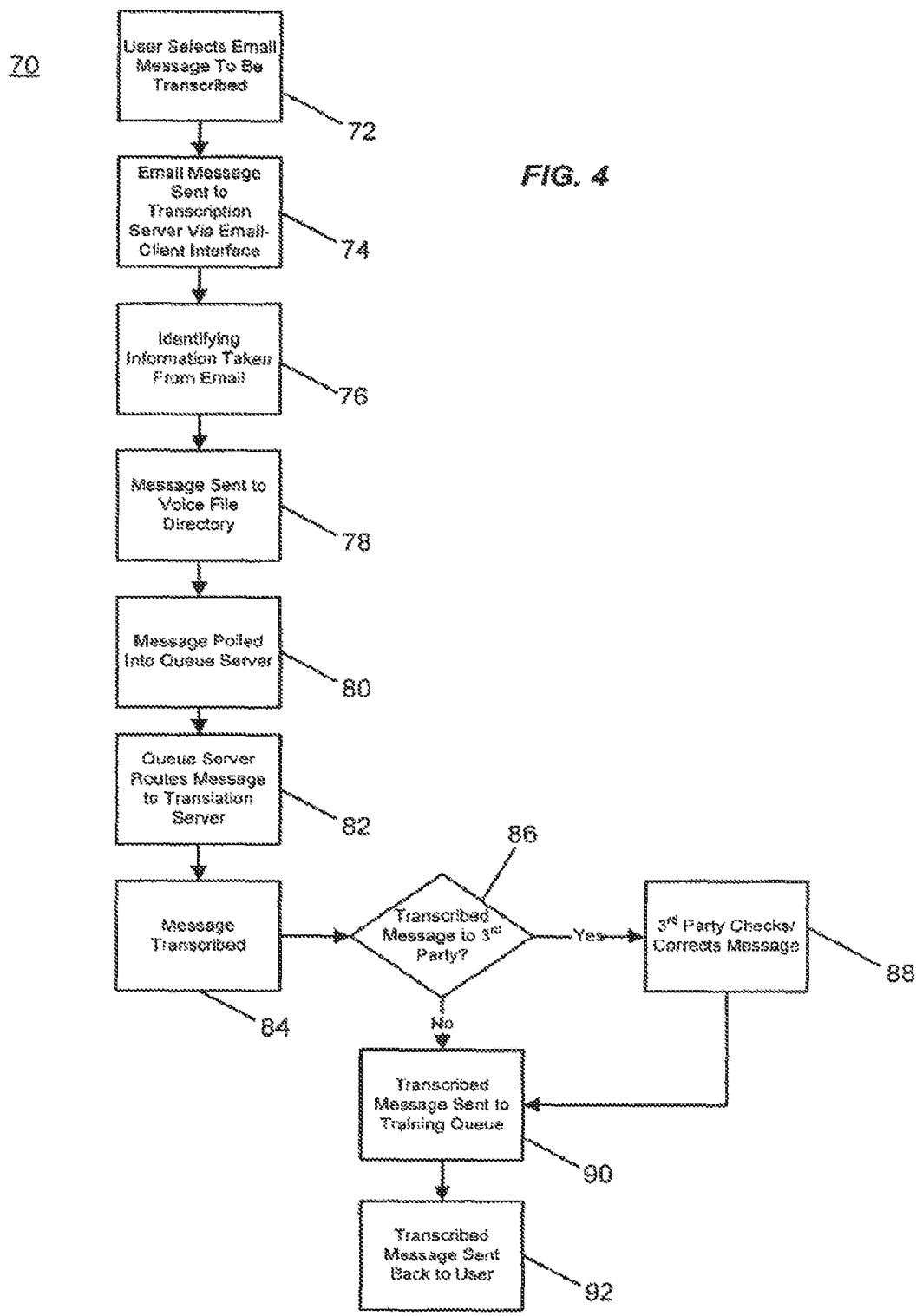
FIG. 4 illustrates a process for transcribing audio data using the email-client interface according to an embodiment of the invention.

FIG. 4 illustrates a process 70 for using the email-client interface 60 to send messages including audio data through the transcription system 10. The user selects one or more email messages including audio data to be transcribed (step 72). In some embodiments, the selected email message include attached audio data representing voice mail messages. Selecting the email messages may include highlighting the messages, opening individual messages, or any other acceptable selection techniques. After step 72, the user selects the send button 62 from the email-client interface 60 to forward the selected email messages to the transcription server 20 (step 74). Additionally or alternatively, the user can reply to a message from the transcription server 20, make changes or corrections to the transcribed text, and send the message back to the transcription server 20, as described below.

When the messages arrive at the transcription server 20, identifying information is taken from the email messages to identify a user account (step 76). In some embodiments the identifying information is metadata taken from the email message. The metadata may include, among other things, information such as a sender's email address and IP address. In other embodiments, identifying information is included in the body of the email message and extracted to identify a user account. After the account is identified, the message is sent to a voice file directory 52 related to that account (step 78). Account settings, such as, for example, destination information and formatting information, may be modified for each account. The account settings can be modified or accessed through a system interface, such as the email-client correction interface.

The messages stored in the voice file directory 52 awaiting transcription are polled into a queue server 54 (step 80). The queue server 54 holds the messages until a translation server 56 becomes available. When a translation server 56 becomes available, the queue server 54 routes the messages to the available translation server 56 (step 82). The messages enter the translation server 56 and the audio data associated with the message is transcribed (step 84). As described below, the transcription server can also receive messages with corrected transcribed text. If the transcription server 20 receives a message including corrected transcribed text, the transcription server 20 compares the original transcribed text with the user-corrected transcribed text. After the transcription server 20 has compared the original and the user-corrected text, a message including the user-corrected text or the differences between the original text and the user-corrected text is sent to a training queue to update the voice model, as described below.

After the audio data has been transcribed, the transcribed text may be sent to a third party for correction or may be sent directly to one or more destinations specified in the user's account settings (step 86). As described above, the transcribed text can be sent to a destination in an email message (e.g., embedded or as an attached file). In some embodiments, if the transcribed text is not sent to a third party, it is sent directly to the training queue to update the voice model (step 90). If the transcribed text is sent to a third party for correction, the third party will correct the transcription using, for example, the email-client correction interface described below (step 88). After step 88, the transcribed and/or corrected text is sent to the training queue to update the voice model (step 90). The transcribed text is then sent back to the user (step 92). A more detailed description of the transcription server 20 is provided below.

Figure 5:
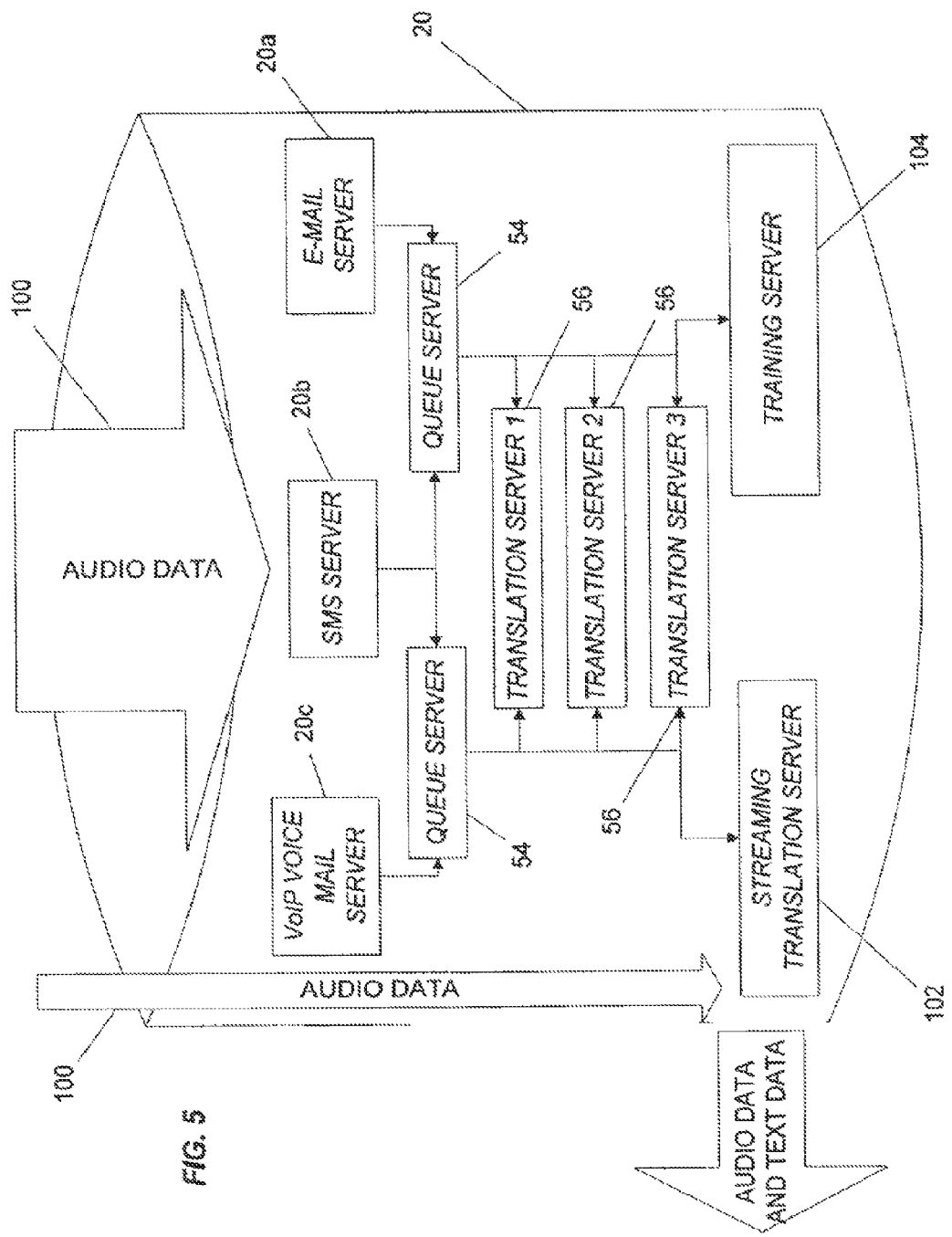
FIG. 5 illustrates the transcription server of FIGS. 1 and 2 according to an embodiment of the invention.

As shown in FIG. 5, the transcription server 20 receives audio data 100 from one or more of the audio data sources 30. In some embodiments, as noted above, the transcription server 20 includes or is connected to one or more intermediary servers, such as an email server 20a, that receive messages from the audio data sources 30. Additional intermediary servers may be present such as a voice over IP ("VoIP") server 20c and a short message service ("SMS") server 20b to receive audio data from additional sources. The messages can be received continuously or in batch form, and can be sent to the transcription server 20 and/or pulled by the transcription server 20 in any manner (e.g., continuously, in batch form, and the like). For example, in some embodiments, the transcription server 20 is adapted to request messages at regular intervals and/or to be responsive to a user command or to some other event. In some embodiments, rather than immediately transmitting the converted message(s) to the transcription server 20, the audio data sources 30 and/or any intermediary servers store the converted message(s) until requested by the transcription server 20 or a separate polling computer. By requesting messages from the audio data sources 30 and/or any intermediary servers, the transcription server 20 or the separate polling computer can manage the messages. For example, in one implementation, the transcription server 20 or a separate polling computer establishes a priority for received messages to be transcribed. The transcription server 20 or a separate polling computer also determines a source of a received message (e.g., the audio data source 30 that transmitted the message). For example, the transcription server 20 or separate polling computer can use metadata taken from the email containing audio data to identify the source of a particular message. In additional embodiments, other types of identifying data can be used to identify the source of a received message.

Once the transcription server 20 or separate polling computer receives one or more messages (received by request or otherwise), the transcription server 20 or separate polling computer places the messages and/or the associated audio data to be transcribed into one or more queue servers 54. The queue servers 54 look for an open or available processor or translation server 56. As shown in FIG. 5, the transcription server 20 includes multiple translation servers 56, although a different number of translation servers 56 (e.g., physical or virtual) are possible. Upon identifying an available translation server 56, the queue servers 54 route audio data to the available translation server 56. The translation server 56 transcribes the audio data to generate text data and, in some embodiments, indexes the message. The translation servers 56 index the messages using a database to identify discrete words. For example, the translation server 56 can use an extensible markup language ("XML"), structured query language ("SQL"), mySQL, idx, or other database language to identify discrete words or phrases within the transcribed text.

In addition to transcribing audio data included in messages as just described, some embodiments of a translation server 56 generate an index of keywords based upon the transcribed text. For example, in some embodiments, the translation server 56 removes those words that are less commonly searched and/or less useful for searching (e.g., I, the, a, an, but, and the like) from transcribed text, which leaves a number of keywords that can be stored in memory available to the translation servers 56. The resulting "keyword index" includes the exact positions of each keyword in the transcribed text, and, in some cases, includes the exact location of each keyword in the corresponding audio data. This keyword index enables users to perform searches on transcribed text. For example, a user accessing the transcribed text associated with particular audio data (whether for purposes of correcting any errors in the transcribed text or for searching within the transcribed text) can select one or more words from the keyword index of the message generated earlier. In so doing, the exact locations (e.g., page and/or line numbers) of such words can be provided quickly and efficiently—in many cases significantly faster and with less processing power than performing a standard search for the word through the entire transcribed text. The system 10 can provide the keyword index to a user in any suitable manner, such as in a pop-up or pull-down menu included in an interface of the system 10, such as the email-client correction interface, during text correction or searching of transcribed text (described below).

Also, in some embodiments, a translation server 56 generates two or more possible candidates for a transcription of a spoken word or phrase from audio data. The most likely candidate is displayed or otherwise used to generate the transcribed text, and the less likely candidate(s) are saved in a memory accessible by the translation server 56 and/or by another server or third party device 40 as needed. This capability can be useful, for example, during correction of the transcribed text (described below). In particular, if a word in the transcribed text is wrong, a user can obtain other candidate(s) identified by the translation server 56 during transcription, which can speed up and/or simplify the correction process.

Once audio data is transcribed, the system 10 can allow a user to search transcribed text for particular words and/or phrases. This searching capability can be used during correction of transcribed text as described below or when a transcribed text file is searched for particular words (whether a search for such words is performed on the file alone or in combination with one or more other files). For example, using the indexed message, a user viewing generated text data can select a word or phrase included in the text data and, in some embodiments, can hear the corresponding portion of the audio data from which the text data was generated. In some embodiments, the system 10 is adapted to enable a user to search some or all transcribed text files accessible by the transcription server 20, regardless of whether such files have been corrected. Also, the system 10 can enable a user to search transcribed text using Boolean and/or other search terms.

Search results can be generated in a number of manners, such as in a table form enabling a user to select one or more files in which a word or phrase has been found and/or one or more locations at which a word or phrase has been found in particular text data. The search results can also be sorted in one or more manners according to one or more rules (e.g., date, relevance, number of instances in which the word or phrase has been found in text data, and the like) and can be printed, displayed, or exported as desired. In some embodiments, the search results also provide the text around the found word or phrase. The search results can also include additional information, such as the number of instances in which a word or phrase has been found in a transcribed text file and/or the number of transcribed text files in which a word or phrase has been found.

After the translation servers 56 index and translate audio data, the audio data and/or the generated text data is stored. The audio data and text data can be stored internally by the transcription server 20 or can be stored externally to one or more data storage devices (e.g., databases, servers, and the like). In some embodiments, a user (e.g., a user associated with a particular audio data source email-client 30) decides how long audio data and/or text data is stored by the transcription server 20, after which time the audio data and/or text data can be automatically deleted, over-written, or stored in another storage device (e.g., a relatively low-accessibility mass storage device). An interface of the system 10 (e.g., the email-client correction interface) enables a user to specify a time limit for audio data and/or text data stored by the transcription server 20.

As shown in FIGS. 1 and 2, a data source email-client 30 connects to the transcription server 20 over a network, such as the Internet, one or more local or wide-area networks 50, or the like, in order to obtain audio data and/or corresponding, generated text data. A user uses the data source email-client 30 to access the email-client correction interface associated with transcription server 20 to obtain generated text data and/or corresponding audio data. For example, using the email-client interface correction, the user can request particular audio data and/or the corresponding text data. The requested data is obtained from the transcription server 20 and/or a separate data storage device and is transmitted to the user for display via the interface.

The transcription server 20 sends audio data and/or corresponding generated text data to the user as an email message. The transcription server 20 can send an email message to a user that includes the audio data and the text data as attached files. In other embodiments, the transcription server 20 sends an email message to a user that includes a notification that audio data and/or text data is available for the user. A user uses the email-client correction interface in order to listen to the audio data, view the text data, and/or to correct the text data. As described above, in some embodiments, a user can reply to the email message sent from the transcription server 20, correct the transcription, and send the corrected transcription back to the transcription server 20. The transcription server then updates the voice model based on a comparison of the original transcribed text and the user-corrected transcribed text. If the user replies directly to the transcription server, the user does not need to access the email-client correction interface, web interface, or other interfaces of the system 10.

In other embodiments, the user can choose to correct only parts of transcribed text. If the user corrects only a portion of the transcribed text, the email-client (e.g., the email-client correction interface) recognizes that only a portion of the text has changed and transmits only the corrected portion of the text to the transcription server 20 for use in training the voice model. By submitting only the corrected or changed portion of the transcribed text, the amount of data transmitted to the transcription server 20 for processing is reduced. In other embodiments, another email-client interface, a web-based interface, the transcription server 20, or another device included in the system 10 can determine what portions of transcribed text have been changed and can limit transmission and/or processing of the changed text accordingly.

If a user forwards or sends an email message to the transcription server 20 that includes audio data, the transcription server 20 can send a return email message to the user after the transcription server 20 transcribes the submitted audio file. The email message can inform the user that the submitted audio data was transcribed and that corresponding text data is available. As previously noted, the email message from the transcription server 20 can include the submitted audio data and/or the generated text data.

The system 10 can also enable a user to provide destination settings for audio data and/or text data on a per-generated-text-data basis. In some embodiments, before or after audio data is transcribed, a user specifies a particular destination for the text data. As described above, certain implementations allow a user to specify destination settings in an email message. For example, if the user sends an email message to the transcription server 20 that includes audio data, the user can specify destination information in the email message. After the audio message is transcribed and the generated text data is corrected (if applicable), the transcription server 20 sends an email message to the identified recipient (e.g., via a SMTP server).

In some embodiments, to protect the privacy and security of the audio and text data, the transcription server 20 transmits data (e.g., audio data and/or text data) to the third party device 40 or another destination device using file transfer protocol ("FTP"). The transmitted data can also be protected by a secure socket layer ("SSL") mechanism (e.g., a bank level certificate).

In one embodiment, system 10 includes an email-client correction interface and a streaming translation server 102 that a user accesses (e.g., via the data source email-client 30) to view generated text. As described below with respect to FIG. 11, in some embodiments, the email-client correction interface and the streaming translation server 102 also enable a user to stream the entire audio data corresponding to the generated text data and/or to stream any desired portion of the audio data corresponding to selected text data. For example, the email-client correction interface and the streaming translation server 102 enable a user to select (e.g., click-on, highlight, mouse over, etc.) a portion of the text in order to hear the corresponding audio data. In addition, in some embodiments, the email-client correction interface and the streaming translation server 102 enable a user to specify a number of seconds that the user desires to hear before and/or after a selected portion of text data.

The email-client correction interface also enables a user to correct generated text data. For example, if a user listens to audio data and determines that a portion of the corresponding generated text data is incorrect, the user can correct the generated text data via the email-client correction interface. In some embodiments, the email-client correction interface automatically identifies potentially incorrect portions of generated text data by displaying potentially incorrect portions of the generated text data in a particular color or other format (e.g., via a different font, highlighting in bold, italics, underline, or any other manner). The email-client correction interface also displays portions of the generated text in various colors or other formats depending on the confidence that the portion of the generated text is correct. The email-client correction interface also inserts a placeholder (e.g., an image, an icon, etc.) into text that marks portions of the generated text where text is missing (i.e., the transcription server 20 could not generate text based on the audio data). A user selects the placeholder in order to hear the audio data corresponding to the missing text and can insert the missing text accordingly.

In order to assist a user in correcting generated text data, some embodiments of the email-client correction interface automatically generate words similar to incorrectly-generated words. In this regard, a user selects a word (e.g., by highlighting, clicking, or by any other suitable manner) within generated text data that is or appears to be incorrect. Upon such selection, the email-client correction interface suggests similar words, such as in a pop-up menu, pull-down menu, or in any other format. The user selects a word or words from the list of suggested words in order to make a desired correction.

In some embodiments, the translation server(s) 56 are configured to automatically determine speakers in an audio file. For example, the translation server 56 processes audio files for drastic changes in voice or audio patterns. The translation server 56 then analyzes the patterns in order to identify the number of individuals or sources speaking in an audio file. In other embodiments, a user or information associated with the audio file (e.g., information included in the email message containing the audio data, or stored in a separate text file associated with the audio data) identifies the number of speakers in an audio file before the audio file is transcribed. For example, a user uses an interface of the system 10 (e.g., the email-client correction interface) to specify the number of speakers in an audio file before or after the audio file is transcribed.

After identifying the number of speakers in an audio file, the translation server(s) 56 can generate a speaker list that marks the number of speakers and/or the times in the audio file where each speaker speaks. The translation server(s) 56 can use the speaker list when creating or formatting the corresponding text data to provide markers or identifiers of the speakers (e.g., Speaker 1, Speaker 2, etc.) within the generated text data. In some embodiments, a user can update the speaker list in order to change the number of speakers included in an audio file, change the identifier of the speakers (e.g., to the names of the speakers), and/or specify that two or more speakers identified by the translation server(s) 56 relate to a single speaker or audio source. Also, in some embodiments, a user can use an interface of the system 10 (e.g., the email-client correction interface) to modify the speaker list or to upload a new speaker list. For example, a user can change the identifiers of the speakers by updating a field of the email-client correction interface that identifies a particular speaker. For example, each speaker identifier displayed within generated text data can be placed in a user-editable field. In some embodiments, changing an identifier of a speaker in one field automatically changes the identifier for the speaker throughout the generated text data.

In some embodiments, the system 10 also formats transcribed text data based on one or more templates, such as templates adapted for particular users or businesses (e.g., medical, legal, engineering, or other fields). For example, after generating text data, the system 10 (e.g., the translation server(s) 56) compares the text data with one or more templates. If the format or structure of the text data corresponds to the format or structure of a template and/or if the text data includes one or more keywords associated with a template, the system 10 formats the text data based on the template. For example, if the system 10 includes a template specifying the following format:

Date:
Type of Illness:

and text data generated by the system 10 is "the date today is September the 12$^{th}$, the year is 2007, the illness is flu," the system 10 automatically applies the template to the text data in order to create the following formatted text data:

Date: Sep. 12, 2007
Type of Illness: Flu

In some embodiments, the system 10 is configured to automatically apply a template to text data if text data corresponds to the template. Therefore, as the system 10 "learns" and improves its transcription quality, as described below, the system 10 also "learns" and improves its application of templates. In other embodiments, a user uses an interface of the system 10 (e.g., the email-client correction interface) to manually specify a template to be applied to text data. For example, a user can select a template to apply to text data from a drop down menu or other selection mechanism included in the interface.

The system 10 can store the formatted text data and can make the formatted text data available for review and correction, as described below. In some embodiments, the system 10 stores or retains the unformatted text data separately from the formatted text data. By retaining the unformatted text data, the text data can be applied to new or different templates. In addition, the system 10 can use the unformatted text data to train the system 10, as described below.

The system 10 is configured to allow a user to create a customized template and upload the template to the system. For example, a user uses a word processing application, such as Microsoft® Word®, to create a text file that defines the format and structure of a customized template. The user then uploads the text file to the system 10 using an interface of the system 10 (e.g., the email-client interface 60 and/or the email-client correction interface). In some embodiments, the system 10 reformats uploaded templates. For example, the system 10 can store predefined templates and/or customized templates in a mark-up language, such as XML or HTML.

Templates can be associated with a particular user or a group of users. For example, only users with certain permission may be allowed to use or apply particular templates. In other embodiments, a user can upload one or more templates that only he or she can use or apply. Settings and restrictions for predefined and/or customized templates can be configured by a user or an administrator using an interface of the system 10.

In some embodiments, alternatively or in addition to configuring templates, the system 10 enables a user to configure one or more commands that replace transcribed text with different text. For example, a user configures the system 10 to insert the current date into text data whenever audio data and/or corresponding text data includes the word "date" or the phrases "today's date," "current date," or "insert today's date." Similarly, in another embodiment, system 10 is configured to start a new paragraph within transcribed text data each time audio data and/or corresponding text data includes the word "paragraph," the phrase "new paragraph," or a similar identifier. The commands can be defined on a per user basis and/or on a group of users basis, and settings or restrictions for the commands can be set by a user or an administrator using the system 10.

Some embodiments of the system 10 also enable a user correcting text data via the email-client correction interface to create commands and/or keyboard shortcuts. In one example, the system is configured so that a user can use the commands and/or keyboard shortcuts to stream audio data, add common words or phrases to text data, play audio data, pause audio data, or start or select objects or functions provided through the email-client correction interface or other interfaces of the system 10. In some embodiments, a user uses the email-client correction interface to configure the commands and/or keyboard shortcuts. The commands and/or keyboard shortcuts can be stored on a user level and/or a group level. An administrator can also configure commands and/or keyboard shortcuts that can be made available to one user or multiple users. For example, users with particular permissions may be allowed to use particular commands and/or keyboard shortcuts.

In one embodiment, the email-client correction interface reacts to commands spoken by the user. In another embodiment, the system 10 is configured to permit a user to create commands that when spoken by the user cause the email-client correction interface to perform certain actions. In some embodiments, the user can say "play," "pause," "forward," "backward," etc. to control the playing of the audio data by the email-client correction interface. Other commands include insert, delete, or edit text in transcribed text data. For example, when user says "date," the email-client correction interface inserts date information into transcribed text data.

In some embodiments, the system 10 also performs translations of transcribed text data. For example, the email-client correction interface or another interface of the system 10 includes features to permit a user to request a translation of transcribed text data into another language. The transcription server 20 includes one or more language translation modules configured to create text data in a particular language based on generated text data in another language. The system is also configured to process an audio source (e.g., an individual submitting an email message with an attached audio file to the transcription server 20) with a request to translate the file to a specific language when an audio file is submitted to the transcription server 20.

With continued reference to the illustrated embodiment of FIG. 5, corrections made by a user through the email-client correction interface are transmitted to the transcription server 20. As shown in FIG. 5, the transcription server 20 includes a training server 104. The training server 104 can use the corrections made by a user to "learn" so that future incorrect translations are avoided. In some embodiments, since audio data is received from one or more audio data sources 30 representing multiple "speakers," and since the email-client correction interface can be accessible over a network by multiple users, the training server 104 receives corrections from multiple users and, therefore, uses a voice independent model to learn from multiple speakers or audio data sources.

In some embodiments, the system 10 transcribes audio files of a predetermined size (e.g., over 20 minutes in length) in pieces in order to "pre-train" the translation server(s) 56. For example, the transcription server 20 and/or the translation server(s) 56 can divide an audio file into segments (e.g., 1 to 5 minute segments). The translation server(s) 56 can then transcribe one or more of the segments and the resulting text data can be made available to a user for correction (e.g., via the email-client correction interface). After the transcribed segments are corrected and any corrections are applied to the training server 104 in order to "teach" the system 10, the translation server(s) 56 transcribe the complete audio file. After the complete audio file is transcribed, the transcription of the complete audio file is made available to a user for correction. Using the small segments of the audio file to pre-train the translation server(s) 56 helps increase the accuracy of the transcription of the complete audio file, which can save time and can prevent errors. In some embodiments, the complete audio file is transcribed before or in parallel with one or more smaller segments of the same audio file. Once the complete audio file is transcribed, a user can then immediately review and correct the text for the complete audio file or can wait until the individual segments are transcribed and corrected before correcting the text of the complete audio file. In addition, a user can request a re-transcription of the complete audio file after one or more individual segments are transcribed and corrected. In some embodiments, if the complete audio file is transcribed before or in parallel with smaller segments and the transcription of the complete audio file has not been corrected by the time the individual segments are transcribed and corrected, the transcription server 20 and/or the translation server(s) 56 automatically re-transcribes the complete audio file.

The voice independent model developed by the transcription server 20 can be shared and used by multiple transcription servers 20. For example, in some embodiments, the voice independent model developed by a transcription server 20 can be copied to or shared with other transcription servers 20. The model can be copied to other transcription servers 20 based on a predetermined schedule, anytime the model is updated, on a manual basis, etc. In some embodiments, a lead transcription server 20 collects audio and text data from other transcription servers 20 (e.g., audio and text data which has not been applied to a training server) and transfers the data to a lead training server 104. The lead transcription server 20 can collect the audio and text data during periods of low network or processor usage. The individual training servers 104 of one or more transcription servers 20 can also take turns processing batches of audio data and copying updated voice models to other transcription servers 20 (e.g., in a predetermined sequence or schedule), which can ensure that each transcription server 20 is using the most up-to-date voice model.

In some embodiments, individuals may be hired to correct transcribed audio files ("correctors"), and the correctors may be paid on a per-line, per-word, per-file, time, or the like basis, and the transcription server 20 can track performance data for the correctors. The performance data can include line counts, usage counts, word counts, etc. for individual correctors and/or groups of correctors. In some embodiments, the transcription server 20 enables a user (e.g., an administrator) to access the performance data via an interface of the system 10 (e.g., an email-client correction interface or a website). The user can use the interface to input personal information associated with the performance data, such as the correctors' names, employee numbers, etc. In some embodiments, the user can also use the interface to initiate and/or specify payments to be made to the correctors. The performance data (and any related information provided by a user, such as an administrator) can be stored in a database and/or can be exported to an external accounting system, such as accounting systems and solutions provided by Paychex, Inc. or QuickBooks® provided by Intuit, Inc. The transcription server 20 can send the performance data to an external accounting system via a direct connection or an indirect connection, such as the Internet. The transcription server 20 can also generate a file that can be stored to a portable data storage medium (e.g., a compact disk, a jump drive, etc.). The file can then be uploaded to an external accounting system from the portable data storage medium. An external account system can use the performance data to pay the correctors, generate financial documents, etc.

In some embodiments, a user may not desire or need transcribed text data to be corrected. For example, a user may not want text data that is substantially accurate to be corrected. In these situations, the system 10 can allow a user to designate an accuracy threshold, and the system 10 can apply the threshold to determine whether text data should be corrected. For example, if generated text data has a percentage or other measurement of accurate words (as determined by the transcription server 20) that is equal to or greater than the accuracy threshold specified by the user, the system 10 can allow the text data to skip the correction process (and the associated training or learning process). The system 10 can deliver any generated text data that skips the correction process directly to its destination (e.g., directly sent to a user via an email message, directly stored to a database, etc.). In some embodiments, the accuracy threshold can be set by a user using any described interface of the system 10. The threshold can be applied to all text data or only to particular text data (e.g., only text data generated based on audio data received from a particular audio source, only text data that is associated with a particular destination, etc.).

Figure 6:
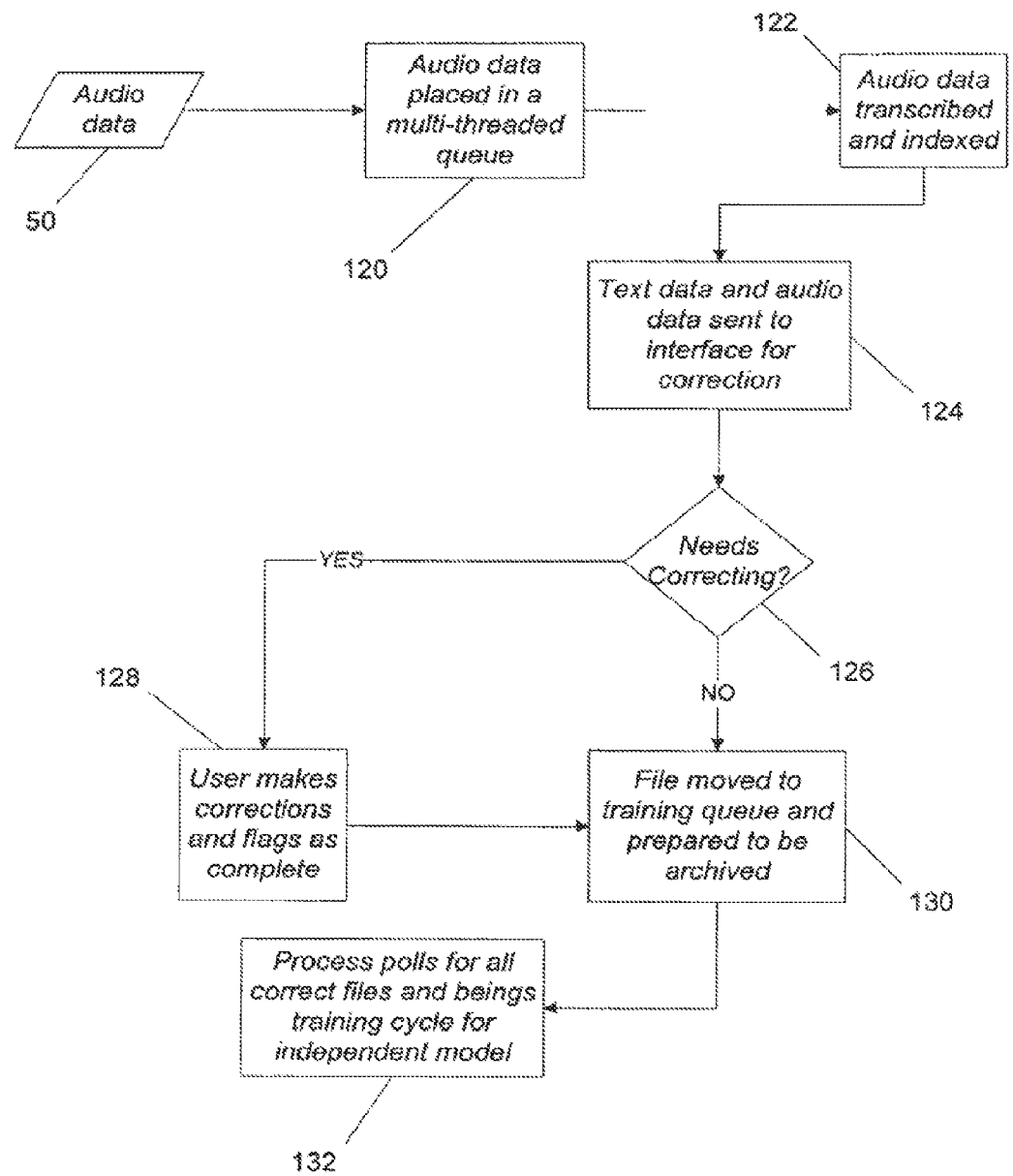
FIG. 6 illustrates a file transcription, correction, and training method according to an embodiment of the invention.

FIG. 6 illustrates an exemplary transcription, correction, and training method or process performed by the system 10. The transcription, correction, and training process of the system 10 can be a continual process by which files enter the system 10 and are moved through the series of steps shown in FIG. 6. As shown in FIG. 6 (also with reference to FIGS. 1-3), the transcription server 20 receives audio data 100 from one or more data source email-clients 30. Next, the transcription server 20 places the audio data 100 into one or more queues 54 (step 120). Once a translation server or processor 56 is available, the audio data 100 is transmitted from a queue 54 to a translation server 56. The translation server 56 transcribes the audio data to generate text data, and indexes the audio data (step 122).

After the audio data is indexed and transcribed, the audio data and/or generated text data is made available to a user for review and/or correction via the email-client correction interface (step 124). If the text data needs to be corrected (step 126), the user makes the corrections and submits the corrections to the training server 104 of the transcription server 20 (step 128). The corrections are placed in a training queue and are prepared for archiving (step 130). Periodically, the training server 104 obtains all the corrected files from the training queue and begins a training cycle for an independent voice model (step 132). In other embodiments, the training server 104 obtains such corrected files immediately, rather than periodically. The training server 104 can be a server that is separate from the transcription server 20, and can update the transcription server 20 and/or other servers on a continuous or periodic basis. In other embodiments, the training server 104, transcription server 20, and any other servers associated with the system 10 are defined by the same computer. It should be understood that, as used herein and in the appended claims, the terms "server," "queue," "module", etc. are intended to encompass hardware and/or software adapted to perform a particular function.

Any portion or all of the transcription, correction, and training process performed by the system 10 can be performed by one or more polling managers (e.g., associated with the transcription server 20, the training server 104, or other servers). In some embodiments, the transcription server 20 and/or the training server 104 utilizes one or more "flags" to indicate a stage of a file. By way of example only, these flags can include: (1) waiting for transcription; (2) transcription in progress; (3) waiting for correction; (4) correction completed; (5) waiting for training; (6) training in progress; (7) retention; (8) move to history pending; and (9) history.

In some embodiments, the only action required by a user as a message moves through different stages of the system 10 is to indicate that correction of the message has been completed. In other embodiments, a less automated system can exist, requiring more input from a user during the transcription, correction, and training process.

Figure 7:
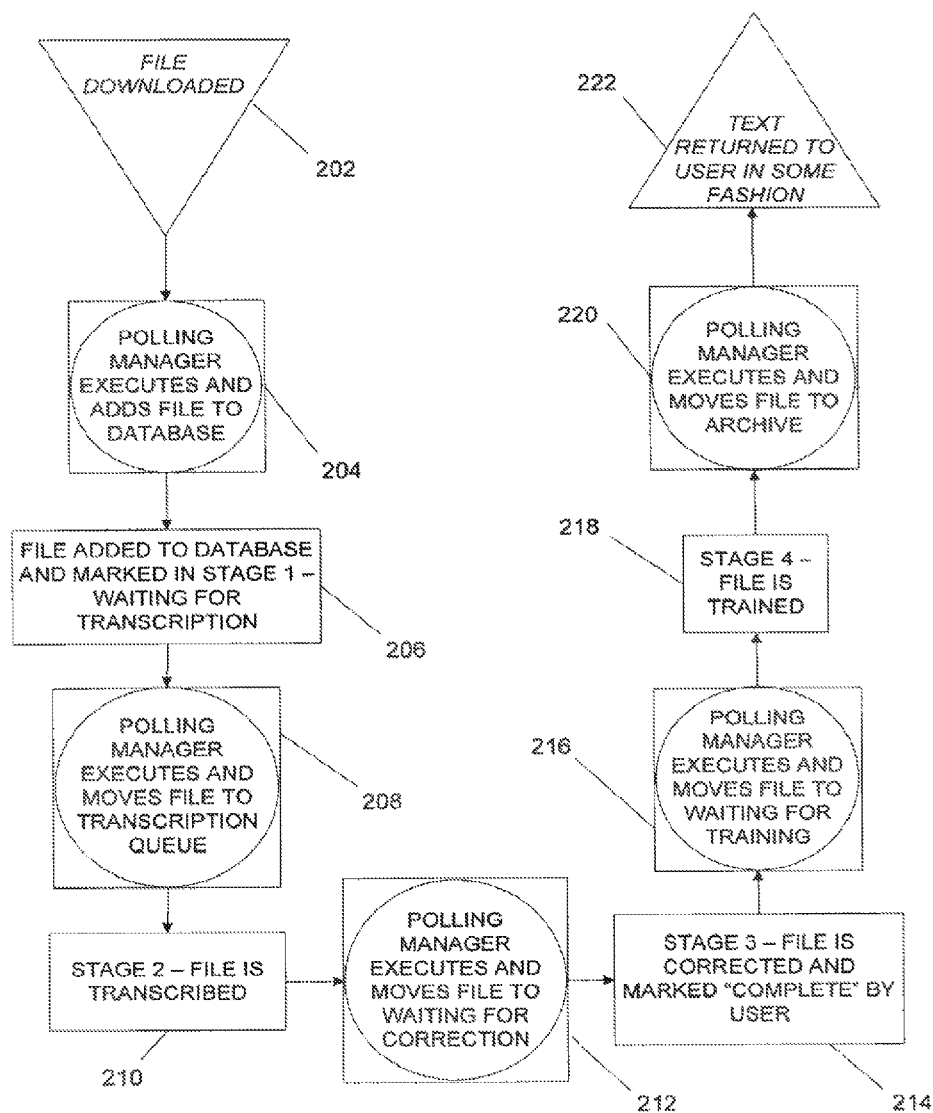
FIG. 7 illustrates another file transcription, correction, and training method according to an embodiment of the invention.

Another example of a method by which messages are processed in the system 10 is illustrated in FIG. 7. In this embodiment, a polling manager is used to control the timing of file processing in the system. In particular, at least a portion of the transcription, correction, and training process is moved along by alternating actions of a polling manager. In some embodiments, the polling manager runs on a relatively short time interval to move files from stage to stage within the transcription, correction, and training process. Although not required, the polling manager can move multiple files in different stages to the next stage at the same time.

With reference to the exemplary embodiment illustrated in FIG. 7, the polling manager locates files to enter the transcription, correction, and training process. For example, the polling manager can check a list of FTP servers/locations for new files. New files identified by the polling manger are downloaded (step 202) and added to the database (step 204). When a file arrives, the polling manager flags the file "waiting for transcription" (step 206). The polling manager then executes and moves the file to a transcription queue (step 208), after which time the next available server/processor transcribes the file (step 210) on a first-in, first-out basis, unless a different priority is assigned. Once the file is assigned to a server/processor for transcription, the polling manager flags the file "transcription in progress." When transcription of the file is complete, the polling manager flags the file "waiting for correction" (step 212), and the file is made available to a user for correction (e.g., through the email-client correction interface). When a user is done correcting the file, the polling manager flags the file "correction completed" (step 214). The polling manager then flags the file "waiting for training," and moves the corrected file into a waiting to be trained queue (step 216). During the time in which the training process runs (step 218), the polling manager flags the file "training in progress." After the training process, the polling manager flags the file "retention." In some embodiments, a user-defined retention determines when and whether files are archived. During the time in which a file is being archived (step 220), the polling manager flags the file "move to history pending." When a file has been archived, the polling manager flags the file "history."

The archival process allows files to move out of the system 10 immediately or based at least in part upon set retention rules. Archived or historical files allow the system 10 to keep current files available quickly while older files can be encrypted, compressed, and stored. Archived files can also be returned to a user (step 222) in any manner as described above.

In some embodiments, the email-client correction interface shows the stage of one or more files in the transcription, correction, and training process. This process can be automated and database driven so that all files are used to build and train the voice independent model.

It should be noted that a database-driven system 10 allows redundancy within the system. Multiple servers can share the load of the process described above. Also, multiple servers across different geographic regions can provide backup in the event of a natural disaster or other problem at one or more sites.

Figure 8:
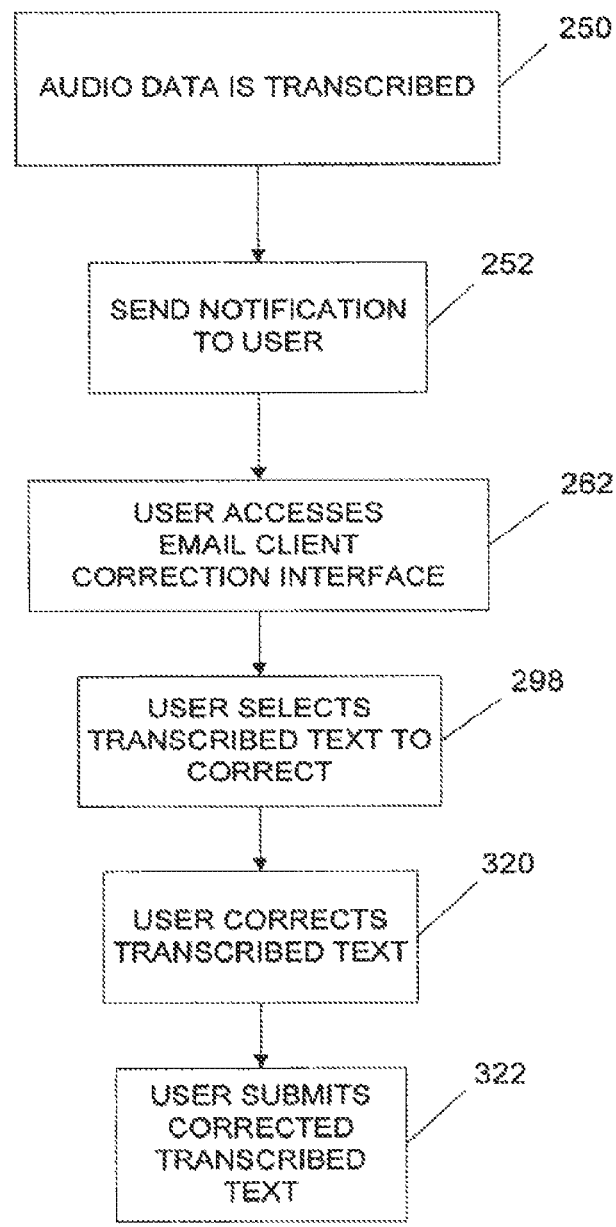
FIG. 8 illustrates a correction method according to an embodiment of the invention.

FIG. 8 illustrates a correction method according to an embodiment of the invention. The correction process of FIG. 8 begins when audio data is received by the transcription server 20 and is transcribed (step 250). As described above with respect to FIGS. 1-2, the transcription server 20 can receive audio data from one or more devices running email-clients 30, such as a computer 30a, a PDA 30b, a blackberry device 30c, a mobile phone 30d, etc.

The transcription server 20 can send the correction notification to a user who is assigned to the correction of transcribed audio data associated with a particular owner or destination. For example, as the transcription server 20 transcribes voicemail messages for a particular member of an organization, the transcription server 20 can send a notification to a secretary or assistant of the member. An administrator can use an interface of the system 10 (e.g., the email-client interface 60) to configure one or more recipients who are to receive the correction notifications for a particular destination (e.g., a particular email account). An administrator can also specify settings for notifications, such as the type of notification to send (e.g., email, text, audio, etc.), the addresses or identifiers of the notification recipients (e.g., email addresses), the information to be included in the notifications, etc. For example, an administrator can establish rules for sending correction notifications, such as transcriptions associated with audio data received by the transcription server 20 from a particular audio data source should be corrected by particular users. In addition, as described above, an administration can set one or more accuracy thresholds, which can dictate when transcribed audio data skips the correction process.

FIG. 9 illustrates an email correction notification 254 according to an embodiment of the invention that is listed in an inbox 255 of an email application. As shown in FIG. 9, the email correction notification 254 is listed as an email message in the inbox 255 similar to other email messages 256 received from other sources. For example, the inbox 255 can display the sender of the email correction notification 254 (i.e., the transcription server 20), an account or destination associated with the audio data and generated text data (e.g., an account number), and an identifier of the source of the audio data (e.g., the name of an individual that sent the message). As shown in FIG. 9, the identifier of the source of the audio data can optionally include an address or location of the audio data source. In some embodiments (e.g., depending on the email application used), the inbox 255 lists additional information about the notification 254, such as the size of the email correction notification 254, the time the notification 254 was sent, and/or the date that the notification 254 was sent.

To read the email correction notification 254, a user can select the notification 254 (e.g., by clicking on, highlighting, etc.) in the inbox 255. After the user selects the notification 254, the email application can display the contents of the notification 254, as shown in FIG. 10. The contents of the email correction notification 254 can include similar information as displayed in the inbox 255. The contents of the email correction notification 254 can also indicate the length of the audio data transcribed by the transcription server 20 and the day, date, and/or time that the audio data was received by the transcription server 20. To correct the transcription, the user can access the email-client correction interface from their email-client. However, if the user does not have access to the email-client correction interface, a link 257 to a web interface is provided in the email correction notification.

Referring to FIGS. 11-14 illustrate the email-client correction interface 260 according to an embodiment of the invention. After a user receives a correction notification 254, the user can access the email-client correction interface 260 to review and correct the generated text data (if needed) (step 262). The email-client correction interface 260 is accessed from within the email-client. For example, when a user receives a correction notification indicating that the user has messages that either have been corrected or are ready to be corrected, the user can access the email-client correction interface 260 without launching a separate web browsing application. Additionally, a user can also reply directly to a correction notification that includes transcribed text, correct the transcribed text in the body of the message, and send the corrected transcribed text back to the transcription server 20. After sending the corrected transcribed text back to the transcription server 20, the voice model is updated accordingly.

Figure 11:
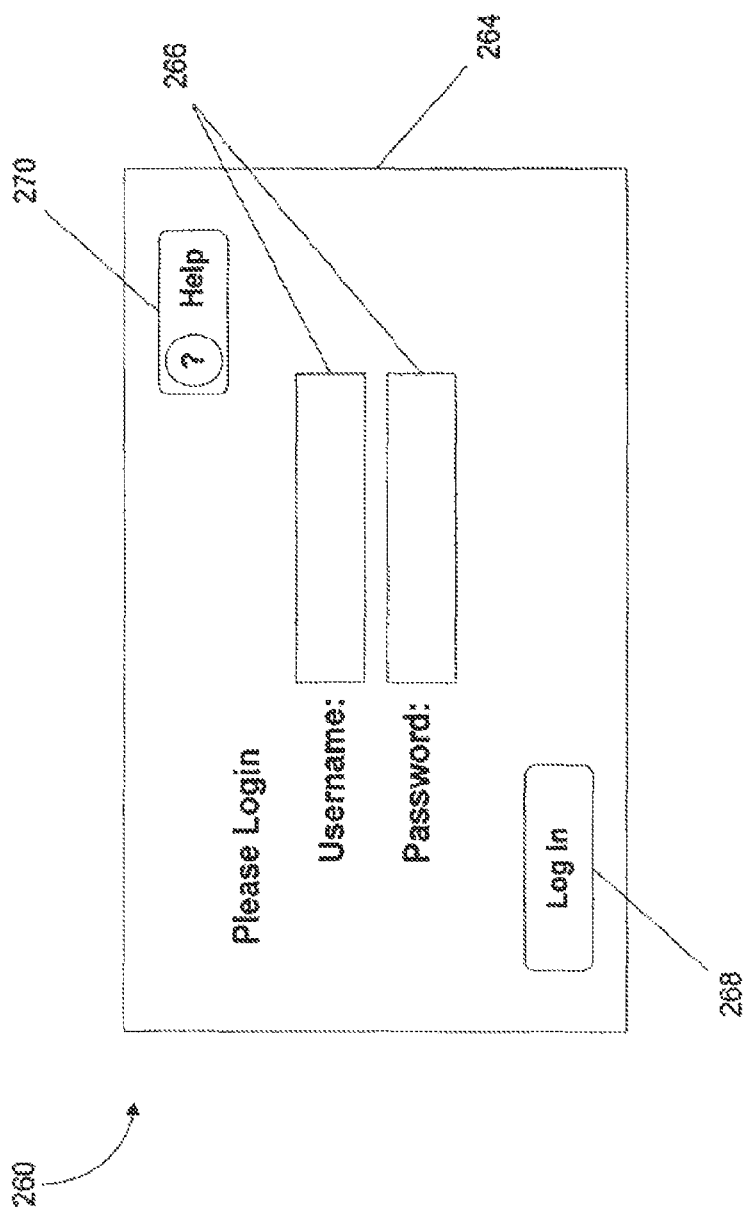

As shown in FIG. 11, to access the email-client correction interface 260, the user may first be prompted to enter credentials and/or identifying information via a login screen 264 of the interface 260. For example, the login screen 264 can include one or more selection mechanisms and/or input mechanisms 266 that enable a user to select or enter credentials and/or identifying information. As shown in FIG. 11, the login screen 264 can include input mechanisms 266 for entering a username and a password. The input mechanisms 266 can be case sensitive and/or can be limited to a predetermined set and/or number of characters. For example, the input mechanisms 266 can be limited to approximately 30 non-space characters. A user can enter his or her username and password (e.g., as set by the user or an administrator) and can select a log in selection mechanism 268. Alternatively, a user can select a help selection mechanism 270 in order to access instructions, tips, help web pages, electronic manuals, etc. for the email-client correction interface 260.

After the user enters his or her credentials and/or identifying information, the email-client correction interface 260 verifies the entered information, and, if verified, the email-client correction interface 260 displays a main page 272, as shown in FIG. 12. The main page 272 includes a navigation area 274 and a view area 276. The navigation area 274 includes one or more selection mechanisms for accessing standard functions of the email-client correction interface 260. For example, as shown in FIG. 12, the navigation area 274 includes a help selection mechanism 278 and a log off selection mechanism 280. As described above, a user can select the help selection mechanism 278 in order to access instructions, tips, help web pages, electronic manuals, etc. for the email-client correction interface 260. A user selects the log off selection mechanism 280 in order to exit the email-client correction interface 260. In some embodiments, if a user selects the log off selection mechanism 280, the email-client correction interface 260 returns the user to the login page 264.

As shown in FIG. 12, the navigation area 274 also includes an inbox selection mechanism 282, a my history selection mechanism 284, a settings selection mechanism 286, a help selection mechanism 288, and/or a log off selection mechanism 290. A user selects the inbox selection mechanism 282 in order to view the main page 272. The user selects the my history selection mechanism 284 in order to access previously corrected transcriptions. In some embodiments, if a user selects the my history selection mechanism 284, the email-client correction interface 260 displays a history page (not shown) similar to the main page 272 that lists previously corrected transcriptions. Alternatively or in addition to displaying the information displayed in the main page 272 (e.g., file name, checked out by, checked in by, creation date, priority), the history page can display correction date(s) for each transcription.

A user can select the settings selection mechanism 286 in order to access one or more setting pages (not shown) of the email-client correction interface 260. The setting pages can enable a user to change his or her notification preferences, email-client correction interface 260 preferences (e.g., change a username and/or password, set a time limit for transcriptions displayed in a history page), etc. For example, as described above, a user can use the settings pages to specify destination settings for audio data and/or generated text data, configure commands and keyboard shortcuts, specify accuracy thresholds, turn on or off particular features of the email-client correction interface 260 and/or the system 10, etc. In some embodiments, the number and degree of settings configurable by a particular user via the settings pages are based on the permissions of the user. An administrator can use the setting pages to specify global settings, group settings (e.g., associated with particular permissions), and individual settings. In addition, an administrator can use a setting page of the email-client correction interface 260 to specify users of the email-client correction interface 260 and can establish usernames and passwords for users. Furthermore, as described above with respect to FIGS. 9 and 10, an administrator can use a setting page of the email-client correction interface 260 to specify notification parameters, such as who receives particular notifications, what type of notifications are sent, what information is included in the notifications, etc.

As shown in FIG. 12, the view area 276 lists transcriptions (e.g., associated with the logged-in user) that need attention (e.g., correction). In some embodiments, the view area 276 includes one or more filter selection mechanisms 292, that a user can use to filter and/or sort the listed transcriptions. For example, a user can use a filter selection mechanism 292 to filter and/or sort transcriptions by creation date, priority, etc.

The view area 274 can also list additional information for each transcription. For example, as shown in FIG. 12, the view area 274 can list a file name, a checked out by parameter, a checked out on parameter, a creation date, and a priority for each listed transcription. The view area 274 can also include an edit selection mechanism 294 and a complete selection mechanism 296 for each transcription.

Returning to FIG. 8, after a user accesses the email-client correction interface 260, the user can select a transcription to correct (step 298). As shown in FIG. 12, to correct a particular transcription, the user selects the edit selection mechanism 294 associated with the transcription. When a user selects an edit selection mechanism 294, the email-client correction interface 260 displays a correction page 300, an example of which is shown in FIG. 13. The correction page 300 includes the navigation area 274, as described above with respect to FIG. 12, and a correction view area 302. The correction view area 302 displays the text data 303 generated by the transcription. A user can edit the text data 303 by deleting text, inserting text, cutting text, copying text, etc. within the correction view area.

In some embodiments, the correction view area 302 also includes a recording control area 304. The recording control area 304 can include one or more selection mechanisms for listening to or playing the audio data associated with the text data 303 displayed in the correction view area 302. For example, as shown in FIG. 13, the recording control area 304 can include a play selection mechanism 306, a stop selection mechanism 308, and a pause selection mechanism 310. A user can select the play selection mechanism 306 to play the audio data from the beginning and can select the stop selection mechanism 308 to stop the audio data. Similarly, a user can select the pause selection mechanism 310 to pause the audio data. In some embodiments, selecting the pause selection mechanism 310 after pausing the audio data causes the correction interface 260 to continue playing the audio data (e.g., from the point at which the audio data was paused).

As shown in FIG. 13, the recording control area 304 can also include a continue from cursor selection mechanism 312. A user can select the continue from cursor selection mechanism 312 in order to start playing the audio data at a location corresponding to the position of the cursor within the text data 303. For example, if a user places a cursor within the text data 303 before the word "Once" and selects the continue from cursor selection mechanism 312, the email-client correction interface 260 plays the audio data starting from the word "Once." In some embodiments, the recording control area 304 also includes a playback control selection mechanism 314 that a user can use to specify a number of seconds to play before playing the audio data starting at the cursor position. For example, as shown in FIG. 13, a user can specify 1 to 8 seconds using the play control selection mechanism 314 (e.g., by dragging an indicator along the timeline or in another suitable manner). After setting the playback control selection mechanism 314, the user can select the continue from cursor selection mechanism 312, which causes the email-client correction interface 260 to play the audio data starting at the cursor position minus the number of seconds specified by the play control selection mechanism 314.

In some embodiments, the recording control area 304 also includes a speed control mechanism (not shown) that allows a user to decrease and increase the playback speed of audio data. For example, the recording control area 304 includes a speed control mechanism that includes one or more selection mechanisms (e.g., buttons, timelines, etc.). A user can select (e.g., click, drag, etc.) the selection mechanisms in order to increase or decrease the playback of audio data by a particular speed. In some embodiments, the speed control mechanism can also include a selection mechanism that a user can select in order to play audio data at normal speed.

In some embodiments, a user can hide the recording control area 304. For example, as shown in FIG. 13, the correction view area 302 can include one or more selection mechanisms 315 (e.g., tabs) that enable a user to choose whether to view the text data 303 only (e.g., by selecting a full text tab 315a) or to view the text data 303 and the recording control area 304 (e.g., by selecting a listen/text tab 315b).

The correction view area 302 can also include a save selection mechanism 316. A user can select the save selection mechanism 316 in order to save the current state of the corrected text data 303. A user can select the save selection mechanism 316 at any time during the correction process.

The correction view area 302 can also include a table 318 that lists, among other things, the system's confidence in its transcription quality. For example, as shown in FIG. 13, the correction view area 302 can list the total number of words in the text data 303, the number of low-confidence words in the text data 303, the number of medium-confidence words in the text data 303, and/or the number of high-confidence words in the text data. "Low" words can include words that are least likely to be correct. "Medium" words can include words that are moderately likely to be correct. "High" words can include words that are very likely to be correct. In some embodiments, if the number of low words in the text data 303 is close to the number of total words in the text data 303, it may be useful for the user to delete the text data 303 and manually retype the text data 303 by listening to the corresponding audio data. This situation may occur if the audio data was received from an audio data source that the system 10 has not previously received data from or has not previously received significant data from.

Returning to FIG. 8, after a user selects a transcription to correct, the user corrects the transcription as necessary via the email-client correction interface 260 (step 320) and submits or saves the corrected transcription (step 322). As described above with respect to FIG. 13, to submit or save corrected text data 303, a user can select the save selection mechanism 316 included in the correction page 300. In some embodiments, when a user selects the save selection mechanism 316, the email-client correction interface 260 displays a save options page 330, as shown in FIG. 14. The save options page 330 can include the navigation area 274, as described above with respect to FIGS. 12 and 13, and a save options view area 332. The save options view area 332 can display one or more selection mechanisms for saving the current state of the corrected text data 303. For example, as shown in FIG. 14, the options view area 332 can include a save recording selection mechanism 334, a save and mark as complete selection mechanism 336, and a save, mark as complete and send to owner selection mechanism 338. A user can select the save recording selection mechanism 334 in order to save the current state of the text data 303 with any corrections made by the user. The user is then returned to the main page 272. A user may select the save recording selection mechanism 334 if the user has not finished making corrections to the text data 303 but wants to stop working on the corrections at the current time. A user may also select the save recording selection mechanism 334 if the user wants to periodically save corrections when working on long transcriptions. In some embodiments, the save recording selection mechanism 334 is the default selection.

A user can select the save and mark as complete selection mechanism 336 in order to save the corrections made by the user and move the transcription to the user's history. Once the corrections are saved and moved to the history folder, the user can access the corrected transcription (e.g., via the history page of the email-client correction interface 260) but may not be able to edit the corrected transcription.

A user can select the save, mark as complete and send to owner selection mechanism 338 in order to save the corrected transcription, move the corrected transcription to the user's history folder, and send the corrected transaction and/or the associated audio data to the owner or destination of the audio data (e.g., the owner's email address). As described above, a destination for corrected transcriptions can include files and multiple devices running email clients. For example, the email-client correction interface 260 can send a message notification to the owner of the transcription that includes the corrected transcription (e.g., as text within the message or as an attached file). FIG. 15 illustrates an email message notification 339 according to an embodiment of the invention. As shown in FIG. 15, the notification 339 includes the corrected transcription.

Once a user selects a save option, the user can select an accept selection mechanism 340 in order to accept the selected option or can select a cancel selection mechanism 342 in order to cancel the selected option. In some embodiments, if a user selects the cancel selection mechanism 342, the email-client correction interface 260 returns the user to the correction page 300.

A user can also select a complete selection mechanism 296 included in the main page 272 of the email-client correction interface 260 in order to submit or save transcriptions. In some embodiments, if a user selects a complete selection mechanism 296 included in the main page 272, the email-client correction interface 260 displays the save options page 330 as described above with respect to FIG. 14. In other embodiments, if a user selects a complete selection mechanism 296 included in the main page 272, the email-client correction interface 260 automatically saves any previous corrections made to the transcription associated with the complete selection mechanism 296, moves the corrected transcription to the user's history folds, and sends the completed transcription and/or the corresponding audio data to the owner or destination associated with the transcription.

The embodiments described above and illustrated in the figures are presented by way of example only and are not intended as a limitation upon the concepts and principles of the invention. As such, it will be appreciated by one having ordinary skill in the art that various changes in the elements and their configuration and arrangement are possible without departing from the spirit and scope of the present invention. For example, in some embodiments the transcription server 20 utilizes multiple threads to transcribe multiple files concurrently. This process can use a single database or a cluster of databases holding temporary information to assist in multiple thread transcription on the same or different machines. Each system or device included in embodiments of the present invention can also be performed by one or more machines and/or one or more virtual machines.

Various features and advantages of the invention are set forth in the following claims.

What is claimed is:

1. A method, comprising:
    receiving a selection of one of a plurality of email messages delivered to an email-client responsive to a user interaction within the email-client;
    displaying a send-for-transcription selection mechanism within the email-client on a computer-controlled display, the send-for-transcription selection mechanism associated with a voice-independent model;
    wherein the voice-independent model is trained based on a plurality of corrected text data sets of transcription requests for audio data representing speech of more than one speaker of a plurality of speakers;
    responsive to an activation of the send-for-transcription selection mechanism, transmitting a communication identifying the selected email message;
    wherein the communication is transmitted to a remote system that is associated with the voice-independent model and is to ascertain whether to segment an audio file corresponding to the communication based on a comparison of a duration associated with the audio file to a threshold, generate a transcription of a subset of segments of a segmentation of the audio file based on the voice-independent model and train the voice-independent model based on a corrected text data set for the subset of the segments; and
    responsive to transmission of the communication, receive transcription data associated with a transcription corresponding to a remainder of the segments, wherein the transcription corresponding to the remainder of the segments is determined based on the voice independent model as trained based on the corrected text data set.

2. The method of claim 1, further comprising displaying a status of the selected email message within the email-client,
    wherein the status indicates at least one of whether the selected email message has been sent to a transcription server of the remote system, whether transcribed text based on the audio file has been received, or whether corrected text data associated with the transcribed text has been received.

3. The method of claim 2, further comprising playing the audio file within the email-client.

4. The method of claim 1, further comprising receiving the transcription corresponding to the remainder of the segments from the remote system.

5. The method of claim 4, further comprising displaying the transcription data within the email-client.

6. The method of claim 5, further comprising receiving corrected text data associated with the transcription corresponding to the remainder of the segments.

7. The method of claim 6, further comprising sending the corrected text data to the remote system.

8. A method, comprising:
    receiving a selected one of a plurality of email messages associated with an email-client;
    correlating the received email message to an account of a plurality of accounts;
    obtaining stored account settings of the correlated account;
    ascertaining whether to segment an audio file corresponding to the received email message based on a comparison of a duration associated with the audio file to a threshold;
    in response to an ascertainment to segment the audio file, segmenting the audio file into segments and generating a transcription of a subset of the segments based on the account settings and a voice-independent model trained based on a plurality of corrected text data sets of transcription requests for audio data representing speech of more than one speaker of a plurality of speakers; and
    additionally training the voice-independent model based on a corrected text data set for the subset of the segments;
    generating a transcription corresponding to a remainder of the segments based on the additionally trained voice independent model; and
    electronically transmitting a communication over an electronic network to cause transcription data associated with the transcription corresponding to the remainder of the segments to be delivered to the email-client as a response to an activation of a send-for-transcription selection mechanism of the email-client.

9. The method of claim 8, wherein the account settings include at least one of transcribed text delivery settings, transcription settings, or transcription format settings.

10. The method of claim 8, wherein correlating the received email message to the account of the plurality of accounts further comprises identifying the account based on metadata taken from the received email message.

11. The method of claim 10, wherein the metadata comprises at least one of an email address or an internet protocol address associated with the received email message.

12. The method of claim 8, wherein correlating the received email message to the account of the plurality of accounts further comprises identifying the account based on information included in the body of the email message.

13. A memory device having instructions stored thereon that, in response to execution by a processing device, cause the processing device to perform operations comprising:
    in response to receiving a communication, correlating the communication to an account of a plurality of accounts;
    wherein the communication includes a selected one of a plurality of email messages associated with an email-client; and
    obtaining stored account settings of the correlated account;
    ascertaining whether to segment an audio file corresponding to the communication based on a comparison of a duration associated with the audio file to a threshold;
    in response to an ascertainment to segment the audio file, segmenting the audio file into segments and generating a transcription of a subset of the segments based on the account settings and a voice-independent model trained based on a plurality of corrected text data sets of transcription requests for audio data representing speech of more than one speaker of a plurality of speakers;

additionally training the voice-independent model based on a corrected text data set for the subset of the segments;

generating a transcription corresponding to a remainder of the segments based on the additionally trained voice independent model; and electronically transmitting a communication over an electronic network to cause transcription data associated with the transcription corresponding to the remainder of the segments to be delivered to the email-client as a response to an activation of a send-for-transcription selection mechanism of the email-client.

14. The memory device of claim 13, wherein the account settings include at least one of transcribed text delivery settings, transcription settings, or transcription format settings.

15. The memory device of claim 13, wherein correlating the communication to the account further comprises identifying the account based on metadata taken from the selected email message.

16. The memory device of claim 15, wherein the metadata comprises at least one of an email address or an internet protocol address associated with the selected email message.

17. The memory device of claim 13, wherein correlating the communication to the account further comprises identifying the account based on information included in the body of the selected email message.

18. An apparatus, comprising:
means for identifying an account of a plurality of accounts in response to receiving a communication;
wherein the communication includes a selected one of a plurality of email messages associated with an email-client;
means for obtaining stored account settings of the identified account;
means for segmenting an audio file corresponding to the communication responsive to a comparison of a duration associated with the audio file to a threshold;
means for generating a transcription of a subset of segments of a segmentation of the audio file based on the account settings and a voice-independent model trained based on a plurality of corrected text data sets of transcription requests for audio data representing speech of more than one speaker of a plurality of speakers;
means for training the voice-independent model based on a corrected text data set for the subset of the segments; and
means for sending, to the email-client, transcription data associated with a transcription corresponding to the remainder of the segments, wherein the transcription corresponding to the remainder of the segments is determined based on the voice independent model as trained based on the corrected text data set, back to the email-client.

19. The apparatus of claim 18, wherein the account settings include at least one of transcribed text delivery settings, transcription settings, or transcription format settings.

* * * * *